(12) United States Patent
Irie et al.

(10) Patent No.: US 9,616,856 B2
(45) Date of Patent: Apr. 11, 2017

(54) LENS CLEANING APPARATUS

(71) Applicant: Clarion Co., Ltd., Saitama (JP)

(72) Inventors: Kota Irie, Saitama (JP); Shoji Muramatsu, Hitachi (JP); Masayuki Takemura, Hitachi (JP); Yasuhisa Hayakawa, Yokohama (JP); Osamu Fukata, Yokohama (JP); Akira Utagawa, Hitachi (JP)

(73) Assignee: Clarion Co., Ltd., Saitama (JP)

( * ) Notice: Subject to any disclaimer, the term of this patent is extended or adjusted under 35 U.S.C. 154(b) by 101 days.

(21) Appl. No.: 14/417,772

(22) PCT Filed: Jul. 19, 2013

(86) PCT No.: PCT/JP2013/069668
§ 371 (c)(1),
(2) Date: Jan. 27, 2015

(87) PCT Pub. No.: WO2014/017404
PCT Pub. Date: Jan. 30, 2014

(65) Prior Publication Data
US 2015/0203076 A1 Jul. 23, 2015

(30) Foreign Application Priority Data
Jul. 27, 2012 (JP) .................. 2012-167302

(51) Int. Cl.
B60S 1/54 (2006.01)
B60S 1/56 (2006.01)
(Continued)

(52) U.S. Cl.
CPC .............. *B60S 1/56* (2013.01); *B60S 1/0848* (2013.01); *B60S 1/481* (2013.01); *G06T 7/174* (2017.01);
(Continued)

(58) Field of Classification Search
CPC .. B60S 1/56; B60S 1/526; B60S 1/481; B60S 1/0848; G06T 7/174; G06T 7/001; G06T 7/0008
(Continued)

(56) References Cited

U.S. PATENT DOCUMENTS 6,791,608 B1 * 9/2004 Miyazawa ........... H04N 5/2254
348/246
8,208,043 B2 * 6/2012 Deng ................... G06T 7/0002
348/234
(Continued)

FOREIGN PATENT DOCUMENTS

JP H11-126248 A 5/1999
JP 2001-171491 A 6/2001
(Continued)

OTHER PUBLICATIONS

Machine translation of JP2007159021, dated Jun. 2007.*
(Continued)

Primary Examiner — Joseph L Perrin
Assistant Examiner — Kevin G Lee
(74) Attorney, Agent, or Firm — Studebaker & Brackett PC

(57) ABSTRACT

A turbidity degree calculating unit calculates a degree of the white turbidity U on a surface of the lens based on a brightness gradient g of an image I (x, y), and a lens cleaning control unit sets a lens cleaning mode for spraying at least one of the cleaning fluid and the compressed air, which is performed by the lens cleaning unit, based on the calculated turbidity degree U.

10 Claims, 22 Drawing Sheets

(51) Int. Cl.
*G06T 7/174* (2017.01)
*B60S 1/08* (2006.01)
*B60S 1/48* (2006.01)
*H04N 5/217* (2011.01)
*B60S 1/52* (2006.01)

(52) U.S. Cl.
CPC .. *B60S 1/52* (2013.01); *B60S 1/54* (2013.01); *H04N 5/2171* (2013.01)

(58) Field of Classification Search
USPC .......................................................... 134/198
See application file for complete search history.

(56) References Cited

U.S. PATENT DOCUMENTS

| | | |
|---|---|---|
| 2009/0250533 A1 | 10/2009 | Akiyama et al. |
| 2011/0073142 A1 | 3/2011 | Hattori et al. |
| 2012/0117745 A1 | 5/2012 | Hattori et al. |
| 2013/0092758 A1* | 4/2013 | Tanaka ...................... B60S 1/56 239/284.1 |
| 2013/0301927 A1* | 11/2013 | Clifton ................... G06T 7/001 382/195 |

FOREIGN PATENT DOCUMENTS

| | | | |
|---|---|---|---|
| JP | 2003315256 A | * | 11/2003 |
| JP | 2007-159021 A | | 6/2007 |
| JP | 2008-288720 A | | 11/2008 |
| JP | 2009-130700 A | | 6/2009 |
| JP | 2009-248661 A | | 10/2009 |
| JP | 2009220719 A | * | 10/2009 |
| JP | 2011-244417 A | | 12/2011 |
| WO | 2007/066580 A1 | | 6/2007 |

OTHER PUBLICATIONS

International Search Report; PCT/JP2013/069668; Aug. 27, 2013.
The extended European search report issued by the European Patent Office on Mar. 1, 2016, which corresponds to European Patent Application No. 13822653.5-1903 and is related to U.S. Appl. No. 14/417,772.

* cited by examiner

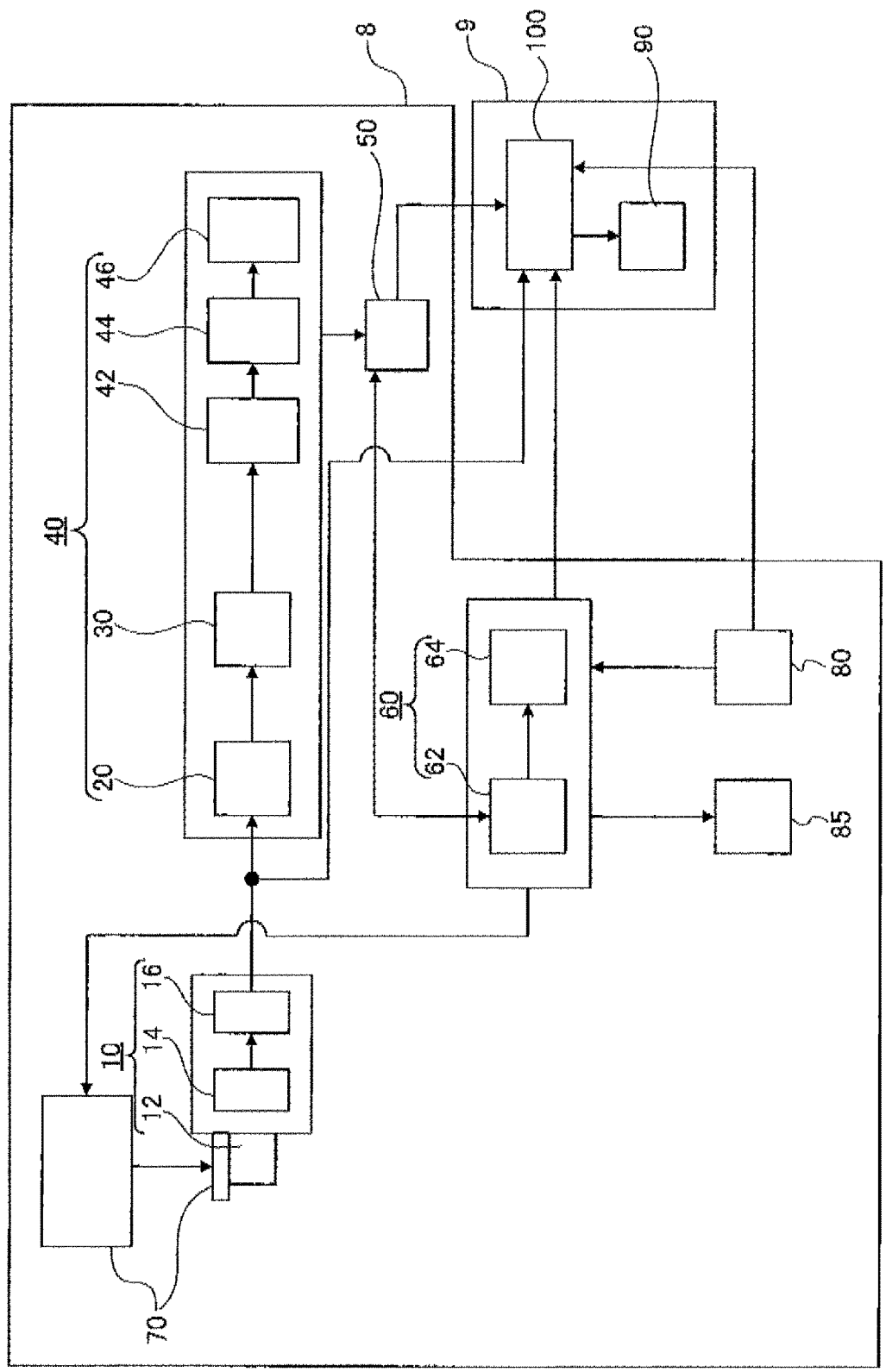

FIG.15

|  | CLEANING MODE 1 (DROP CLEANING) | CLEANING MODE 2 (HP CLEANING) | CLEANING MODE 3 (AIR CLEANING) | SYSTEM ERROR |
|---|---|---|---|---|
| AIR PUMP DRIVING TIME | Tap1 | Tap2 | Tap3 | 0 |
| WASHER PUMP DRIVING TIME | Twp1 | Twp2 | 0 | 0 |
| TURBIDITY DEGREE U | $a1 \leqq U < a2$ | $a2 \leqq U < af$ | $U < a1$ | $U \geqq af$ |
| CERTAINTY FACTOR F | $F \geqq F1$ | $F \geqq F2$ | $F \geqq F3$ | $F \geqq Ff$ |
| DURATION TIME COUNTER C1, C2, C3, Cf | $C1 > t1$ | $C2 > t2$ | $C3 > t3$ | $Cf > tf$ |
| LIMIT NUMBER OF CLEANING | $n1 \leqq N1$ | $n2 \leqq N2$ | $n3 \leqq N3$ | — |

LENS CLEANING APPARATUS

TECHNICAL FIELD

The present invention relates to a lens cleaning apparatus for cleaning stain on a lens surface, which is generated from impurities that have been contained in water and deposited by drying the moisture.

DESCRIPTION OF THE RELATED ART

Recently, a vehicle circumference recognition system has been implemented. The system includes a camera mounted on a vehicle, observes the circumference of the subject vehicle using the camera, detects positions of other vehicles and/or traffic lane markers from the observed camera image, and determines a possibility of a contact with other vehicles and/or of lane departure based on the detected positions of other vehicles and/or traffic lane markers so as to warn the driver.

In this type of the system, water splashed by the subject vehicle may attach to the lens surface of the camera when the vehicle runs in the rain, dust stirred up by the subject vehicle may attach onto the lens surface of the camera when the vehicle runs on an unpaved road, or snow-melting agent stirred up by the subject vehicle may attach onto the lens surface of the camera when the vehicle runs on a road on which the snow-melting agent is sprayed. When these attached matters dry, impurities contained in water, dust, or snow-melting agent is deposited and accumulated on the lens surface. As a result, white-colored stain (hereinafter called "white turbidity") is generated on the lens surface.

Light incident on the lens is scattered by the white turbidity and generates a distortion and/or blur in the observed image, if the lens has the white turbidity. The distortion and/or blur in the image cause decreases in contrasts of the detection target image (e.g., image of other vehicles or lane markers), thereby increasing occurrence possibility of a detection error of or a misdetection of the other vehicles and lane markers. The detection error or misdetection may disturb an appropriate warning with respect to the positions of the other vehicles or lane markers.

Especially, in the system in which occupants in the vehicle are unable to check images taken by the camera, the occupants have no access to find out presence of the white turbidity on the lens. Consequently, the detection error of or the misdetection may make the occupants distrust the system.

To prevent from such a detection error or a misdetection, cleaning the lens to remove the white turbidity is required. Conventionally, there is a known technique to clean a lens. For example, a vehicle-mounted optical sensor apparatus configured to spray cleaning fluid onto the lens surface to clean the lens surface has been taught (for example, Patent Document 1).

RELATED PRIOR ART DOCUMENT

Patent Document

PATENT DOCUMENT 1: JP 2011-244417 A

SUMMARY OF THE INVENTION

Problem to be Solved by the Invention

However, a mode to spray the cleaning fluid is limited to only one mode, which needs to be set first in the apparatus taught in Patent Document 1. As a result, the apparatus always sprays a fixed amount of the cleaning fluid with a fixed spraying pattern regardless of a degree of the white turbidity.

Hence, although the apparatus can sufficiently clean the white turbidity when the degree of the white turbidity is relatively low (i.e., the stain is weak), the apparatus may not be able to clean the white turbidity sufficiently when the degree of the white turbidity is relatively high (i.e., the stain is heavy).

On the other hand, if the cleaning fluid and/or spraying pattern is set such that the heavy stain can sufficiently be cleaned, the cleaning fluid would be unnecessarily sprayed (i.e., wasting the cleaning fluid) when the degree of the white turbidity is relatively low (i.e., the stain is weak).

An object of this invention is, therefore, to provide a lens cleaning apparatus which is configured to change a cleaning method in response to a degree of white turbidity on the lens, thereby enabling to clean the lens surface appropriately in response to the degree of the white turbidity on the lens.

Means for Solving Problem

A lens cleaning apparatus according to the invention can clean white turbidity generated from impurities, which have been contained in water, dust, or snow-melting agent, etc. on a lens surface of a camera and are deposited by drying the moisture.

To be specific, the lens cleaning apparatus according to claim 1 comprises: an imaging unit mounted on a subject vehicle to observe circumference of the subject vehicle through a lens and convert an optical signal of the observed circumference into an image signal; a turbidity degree calculating unit to calculate a degree of white turbidity on the lens from the image signal based on brightness characteristics of the image signal; a lens cleaning unit to clean a surface of the lens using at least one of cleaning fluid and compressed air; and a lens cleaning control unit to set a cleaning mode for spraying the cleaning fluid or the compressed air, which is performed by the lens cleaning unit, based on the calculated turbidity degree on the lens and a first predetermined turbidity degree and a second predetermined turbidity degree which is greater than the first predetermined degree.

In the lens cleaning apparatus according to claim 1, the imaging unit installed to the subject vehicle monitors or observes circumference thereof and converts an optical signal passed through the lens into the image, the turbidity degree calculating unit calculates the degree of the white turbidity on the surface of the lens based on a brightness characteristic of the image, and the lens cleaning control unit sets a cleaning mode for spraying the cleaning fluid or the compressed air based on the calculated degree of the white turbidity to clean the lens surface and a first predetermined turbidity degree and a second predetermined turbidity degree which is greater than the first predetermined degree. With this, it becomes possible to clean the lens surface with the cleaning mode set in response to the degree of the white turbidity on the lens, thereby enabling to remove the white turbidity on the lens efficiently.

Effect of the Invention

The lens cleaning apparatus according to claim 1 can sufficiently clean the lens by the cleaning mode selected in response to the turbidity degree, thereby enabling to clean the white turbidity on the lens surface sufficiently.

BRIEF DESCRIPTION OF THE DRAWINGS

FIG. 2 is a block diagram showing a schematic configuration of the lens cleaning apparatus according to Embodiment 1 of the present invention.

FIG. 15 shows operation specifications for a lens cleaning control unit of the lens cleaning apparatus according to Embodiment 1 of the present invention.

DESCRIPTION OF EMBODIMENTS

Figure 1:
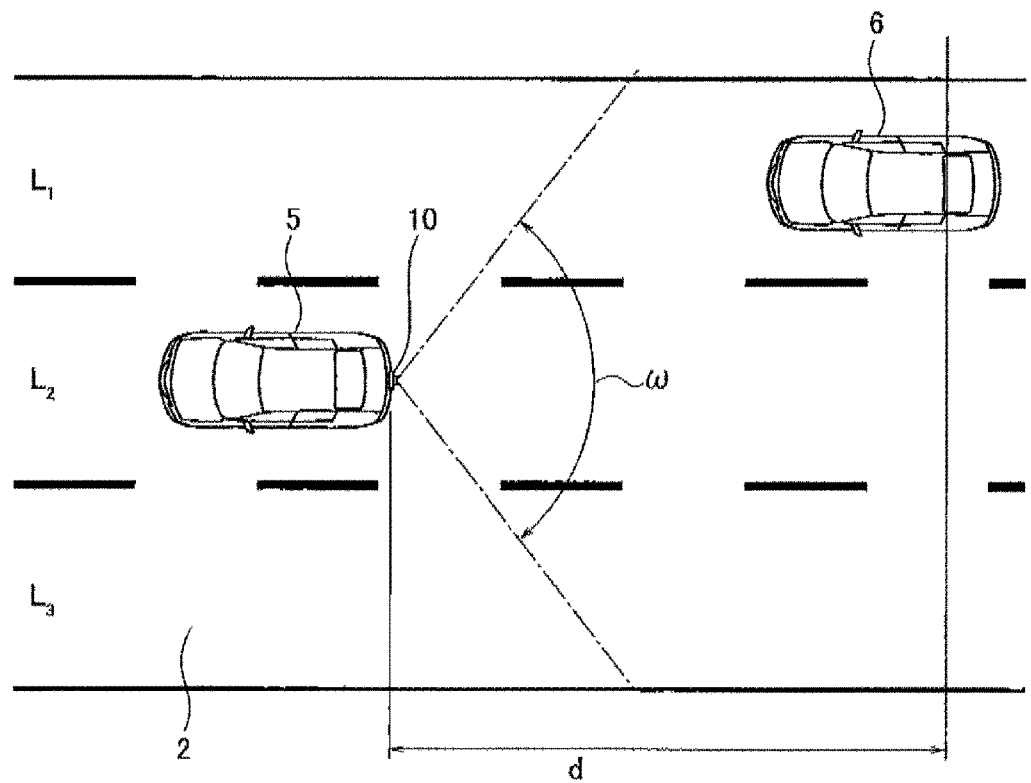
FIG. 1 is an overall view for explaining a blind spot warning (BSW) system, which is one of examples of a vehicle onboard system equipped with a lens cleaning apparatus according to Embodiment 1 of the present invention.

Hereinafter, embodiments of the present invention will be described with reference to the drawings. Note that contrast values of images are called brightness values in following explanations.

Embodiment 1

In this embodiment, the lens cleaning apparatus of the present invention is applied to a vehicle equipped with a blind spot warning (BSW) system, which monitors a rearward direction of the subject (host) vehicle and provides a warning if the BSW system detects an approaching vehicle traveling in adjacent lanes in the rearward direction of the subject vehicle.

First, operation of the BSW system will be explained with reference to FIG. 1. An imaging unit 10 to monitor the rearward direction of the subject vehicle 5 is mounted backward in the rear of the subject vehicle 5 so as to take images of an area to, which includes the adjacent lanes on the right and left side in the rearward direction of the subject vehicle 5 (i.e., the area including lanes $L_1$, $L_2$, and $L_3$ of the road 2). The system detects the approaching vehicle traveling in either lane $L_1$ or $L_3$ from the taken image by performing image processing on the image.

The BSW system is activated when the vehicle 5 is traveling at a speed equal to or greater than a predetermined speed and detects another vehicle 6 traveling in the lane $L_1$ or $L_3$, which is adjacent to the lane $L_2$, when the vehicle 6 is within a distance d from the imaging unit 10. The BSW system recognizes the vehicle 6 as an approaching vehicle when it is confirmed that the detected vehicle 6 is approaching to the subject vehicle 5.

The BSW system determines that the vehicle 6 is approaching to the subject vehicle 5 by analyzing temporal changes in positions of the vehicle 6.

When it is determined that the vehicle 6 is approaching to the subject vehicle 5, the system informs the driver about a presence of the approaching vehicle as a visual information using an indicator or so, which is installed in the subject vehicle 5 (primary warning).

Further, if the driver manipulates a direction indicator without noticing the visual information to change the traveling lane to the lane $L_1$, on which the other vehicle 6 is traveling, the system flashes the indicator and sounds an alarm to clearly inform the driver about the presence of the vehicle 6 (secondary warning), thereby preventing from changing the traveling lane.

Next, a configuration of the lens cleaning apparatus according to Embodiment 1 is now explained with reference to FIG. 2. FIG. 2 shows a configuration in which the lens cleaning apparatus according to the embodiment is applied (installed) to the subject vehicle 5 equipped with the BSW system 9.

As shown in FIG. 2, the lens cleaning apparatus 8 according to Embodiment 1 is installed adjacent to the rear license plate of the subject vehicle 5 (shown in FIG. 1), and includes an imaging unit 10 to monitor or observe the area to as shown in FIG. 1, a turbidity degree calculating unit 40 to calculate a degree of white turbidity on a lens 12, which is attached to the front side of the imaging unit 10, from the image taken by the imaging unit 10, a lens cleaning control unit 60 to set a cleaning mode to clean the lens 12, a lens cleaning unit 70 to clean the lens 12, the BSW system 9, a turbidity degree informing unit 50 to inform the lens cleaning control unit 60 and the BSW system 9 about the degree of the white turbidity calculated by the turbidity degree calculating unit 40, a vehicle information acquisition unit 80 to acquire traveling speed of the subject vehicle 5 and operational signal of a wiper, and an information output unit 85 to display information outputted from the lens cleaning control unit 60.

The imaging unit 10 has the lens 12, a photoelectric conversion unit 14, which comprises a CMOS or so, to convert an optical signal to an electric signal, and a gain adjusting unit 16 to adjust a gain of the converted electric signal.

The turbidity degree calculating unit 40 further includes an area identifying unit 20 to detect and identify a headlight image of a following vehicle, a brightness gradient calculating unit 30 to calculate a brightness gradient on a predetermined line in the area identified by the area identifying unit 20, a brightness gradient average value calculating unit 42 to calculate an average of the brightness gradients on a plurality of the predetermined lines, a similarity calculating unit 44 to discriminate whether the areas detected by the area identifying unit 20 in different time points represent the images of the same light source, and a certainty factor deciding unit 46 to decide a certainty of the calculated degree of the white turbidity.

The lens cleaning control unit 60 further includes an auto-cleaning deciding unit 62 to decide a mode for cleaning the lens 12 with the lens cleaning unit 70, and a system error determining unit 64 to determine or conclude that the lens cleaning unit 70 is not able to remove the white turbidity on the lens 12.

Note that a configuration of the lens cleaning unit 70 will be explained later.

The BSW system 9 includes an approaching vehicle detecting unit 100 to detect an approaching vehicle from the image taken by the imaging unit 10, and a warning unit 90 to warn or draw the driver's attention by using an indicator and/or a buzzer when the approaching vehicle is detected by the approaching vehicle detecting unit 100.

Next, a calculating mode for calculating a degree of the white turbidity on the lens performed by the lens cleaning apparatus 8 according to Embodiment 1 is explained with reference to FIGS. 3A and 3B.

The lens cleaning apparatus 8 according to Embodiment 1 detects a headlight image of a following vehicle, which is traveling on the same lane $L_2$ (see FIG. 1) as the subject vehicle 5, from the image taken by the imaging unit 10, calculates a brightness gradient on a predetermined line in the detected headlight image, and calculates a degree of the white turbidity on the lens based on the calculated brightness gradient.

An image of a strong light source such as a headlight is scattered by the white turbidity on the lens, and a degree of the scattering changes depending on the degree of the white turbidity on the lens. In other words, a bright area representing the light source becomes wider if the lens has a high-degree-white-turbidity thereon. Hence, it is possible to calculate the degree of the white turbidity using this relation. Further, since the light of the headlight is strong (bright), the image signal representing the headlight has a relatively high signal-to-noise ratio (S/N ratio). That is to say, a change amount of the brightness gradient which occurs in response to the degree of the white turbidity becomes large, thereby improving certainty or reliability of the calculated degree of the white turbidity.

Note that the mode for calculating the degree of the white turbidity with the headlight image is available only during night-time, i.e., when the headlight image can be detected or observed. However, light from a strong light source (e.g., a head light) is hardly incident on the imaging unit 10 and further, background-brightness detected by the imaging unit 10 is relatively high during daytime. Consequently, a decrease (difference) in contrast of the detected images during daytime is relatively low, so that it would not affect operation of the BSW system 9 even if the white turbidity is presented on the lens 12.

Figure 3B:
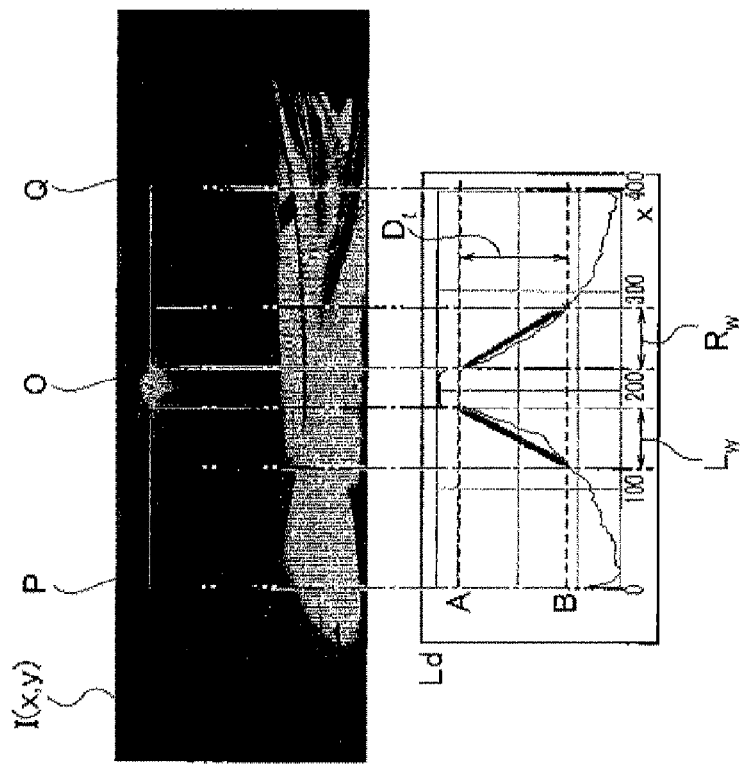
FIG. 3B shows an example of an image taken in a condition where the white turbidity occurs and an example of a brightness distribution of a part of the image.
Figure 3A:
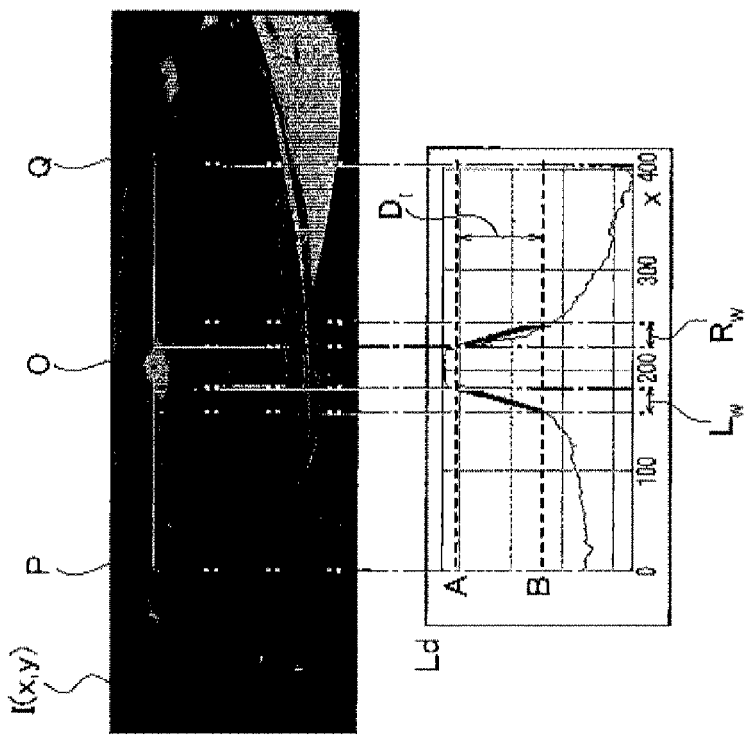
FIG. 3A shows an example of an image taken in a condition where no white turbidity occurs and an example of a brightness distribution of a part of the image.

FIGS. 3A and 3B each shows an example of an image I (x, y) that includes a headlight image of the following vehicle, which is traveling on the same lane as the subject vehicle 5, and is observed by the imaging unit 10 of the lens cleaning apparatus 8. FIG. 3A shows an image without white turbidity on the surface of the lens 12, while FIG. 3B shows an image with the white turbidity on the surface of the lens 12.

Graphs illustrated below the images I (x, y) of FIGS. 3A and 3B each shows a distribution of brightness values (hereinafter called "brightness distribution Ld") in a searching direction (line) OP extending to left from a searching start point O in the headlight image, and a brightness distribution on a line OQ extending to right from the searching start point O in the headlight image.

In FIG. 3A, the number of pixels in a right-and-left direction (horizontal direction) from a point where the brightness distribution Ld on the line OP becomes smaller than a threshold value A (first threshold value) to a point where the brightness distribution Ld becomes smaller than a threshold value B (second threshold value), which is smaller than the first threshold value A, is assigned as $L_W$. Further, the number of pixels in the right-and-left direction from a point where the brightness distribution Ld on the line OQ becomes smaller than the first threshold value A to a point where the brightness distribution Ld on the line OQ becomes smaller than the second threshold value B is assigned as $R_W$. A brightness gradient g is defined as $D_I/L_W$ (a brightness gradient on the line OP) and as $-D_I/R_W$ (a brightness gradient on the line OQ), where $D_I$ represents a brightness difference and is expressed as $D_I=A-B$. Here, absolute values of the brightness gradients g are relatively large, i.e., spreading of the brightness distribution Ld is narrow and steep in FIG. 3A.

On the other hand, in a case of FIG. 3B where the lens surface has white turbidity, absolute values of the brightness gradient g are relatively small, i.e., spreading of the brightness distribution Ld is wider.

The lens cleaning apparatus 8 according to Embodiment 1 first calculates a degree of white turbidity on the lens 12 based on a degree of the brightness gradient g. Specifically, smaller absolute values of the brightness gradient g, higher degree of the white turbidity. Although the details will be explained later, the apparatus only determines that the white turbidity occurs when the brightness gradient g is relatively small for a predetermined period of time, so as to get a better accuracy of a certainty about the calculation of the white turbidity.

Next, lens cleaning process performed by the lens cleaning apparatus 8 is explained with reference to FIG. 4.

Figure 4:
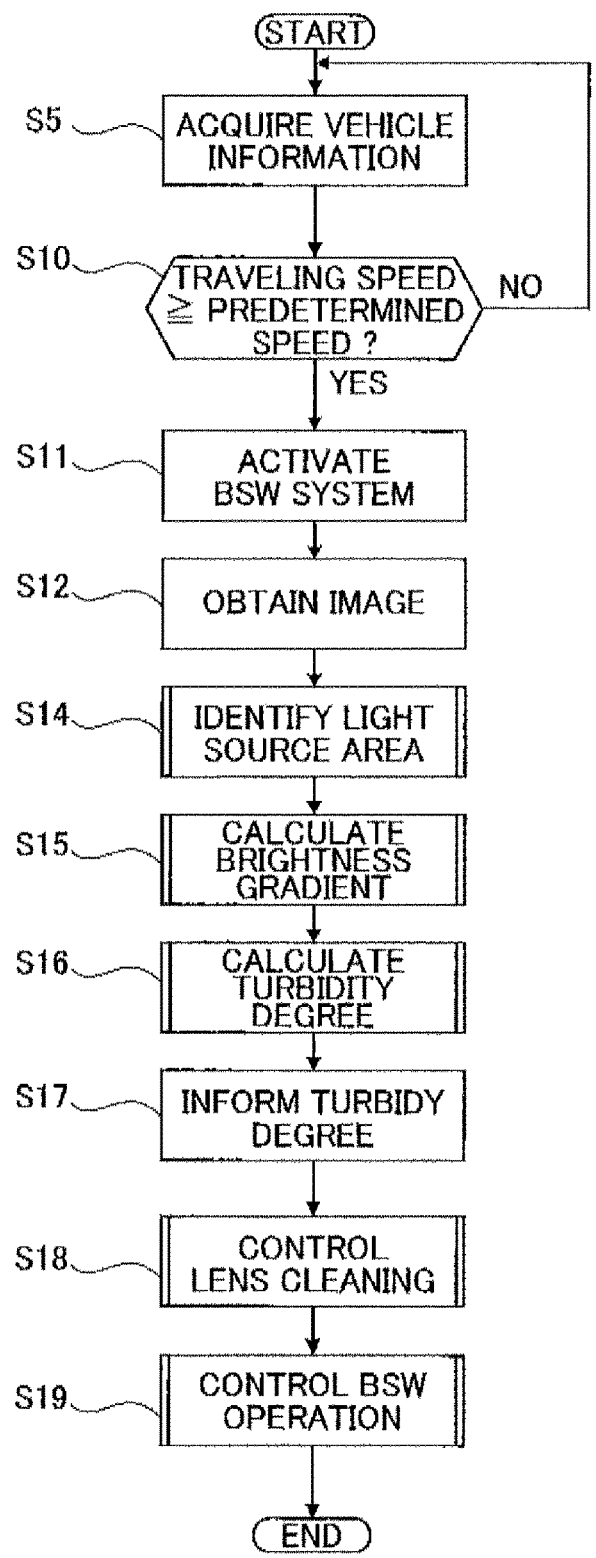
FIG. 4 is a flowchart of a main routine executed by the lens cleaning apparatus according to Embodiment 1 of the present invention.

FIG. 4 is a flowchart of a main routine for cleaning the lens executed by the lens cleaning apparatus 8 according to Embodiment 1.

First, in Step S5, the apparatus acquires a signal of a traveling speed of and an operational signal of a wiper of the subject vehicle 5 through the vehicle information acquisition unit 80.

Next, in Step S10, the approaching vehicle detecting unit 100 analyzes the signal of traveling speed acquired by the vehicle information acquisition unit 80. When the traveling speed of the subject vehicle 5 is equal to or greater than a predetermined speed (e.g., 1 km/h), the program proceeds to Step S11 in which the BSW system 9 is activated. On the other hand, when the traveling speed is slower than the predetermined speed, the program returns to Step S5.

Next, in Step S12, the imaging unit 10 takes (photographs) an image in the rearward direction of the subject vehicle 5. The optical signals passing through the lens 12 are converted to electric signals by the photoelectric conversion unit 14, and the converted electric signals are amplified by the gain adjusting unit 16 to form an image signal I (x, y). Hereinafter, the image signal I (x, y) is simply called an image I (x, y).

The gain adjusting unit 16 amplifies the electric signal converted by the photoelectric conversion unit 14 with an appropriate gain, such that a level of the electric signal is amplified to a predetermined level, and the gain adjusting unit 16 forms the image I (x, y) with the amplified electric signal. Hence, it is possible to obtain an image I (x, y) with a high S/N ratio by multiplying a proper gain to the electric signal even in a dark environment (e.g., during night-time). Note that the gain adjustment is carried out every time the image is taken, and the latest gain value is monitored at the gain adjustment unit 16.

Next, in Step S14, the area identifying unit 20 identifies an area of the headlight (light source) of the following vehicle, which is traveling on the same lane $L_2$ as the subject vehicle 5, from the photographed image I (x, y) only when the gain value is equal to or greater than a predetermined gain value (i.e., when it is determined that the image I (x, y) has been taken (photographed) in night-time). The details of this process will be explained later.

In Step S14, the area identifying unit 20 determines that the image I (x, y) has been taken in daytime when the gain value is smaller than the predetermined value, and thus operates the BSW system 9 without calculating the degree of the white turbidity or cleaning the lens.

In Step S15, the brightness gradient calculating unit 30 calculates the brightness gradient g in the area of the headlight image identified in Step 14. Note the details of this process will be explained later.

Next, in Step S16, the turbidity calculating unit 40 calculates the degree of the white turbidity on the lens 12 based on the brightness gradient g calculated in Step S15. The details of this process will be explained later.

In Step S17, the turbidity informing unit 50 informs the auto-cleaning deciding unit 62 and the approaching vehicle detecting unit 100 about the degree of the white turbidity on the lens 12 calculated in Step S16.

Next, in Step S18, the lens cleaning unit 70 cleans the lens 12 based on a command from the lens cleaning control unit 60. The details of this process will be explained later.

In Step S19, the approaching vehicle detecting unit 100 appropriately changes (selects) actions of the BSW system 9 in response to, for instance, the degree of the white turbidity on the lens 12 informed from the turbidity degree informing unit 50, after the lens cleaning unit 70 has cleaned the lens 12. Specifically, the approaching vehicle detecting unit 100 selects a normal action of the BSW system 9 (i.e., operates the BSW system 9 normally) when it is determined that the white turbidity on the lens 12 has removed by the lens cleaning. On the other hand, the approaching vehicle detecting unit 100 terminates the operation of the BSW system 9, and the information output unit 85 displays or indicates that a system error occurs on a display mounted on the subject vehicle 5 to inform (warn) the driver thereof when it is determined that the white turbidity on the lens 12 is not removed (system error).

Each process shown in FIG. 4 will be explained.

Figure 5:
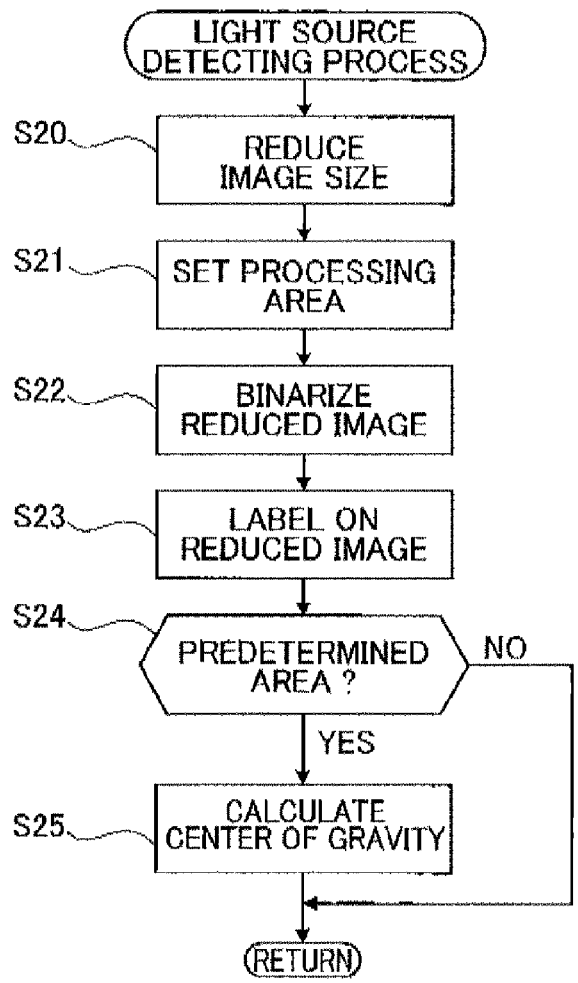
FIG. 5 is a flowchart of light source area identifying process to calculate a degree of the white turbidity, which is executed by the lens cleaning apparatus according to Embodiment 1 of the present invention.

First, the process in Step S14, i.e., the light source identifying process, is explained with reference to a flowchart of FIG. 5 and images of FIGS. 7A to 7D.

In Step S20, the area identifying unit 20 reduces size of the image I (x, y) taken (photographed) by the imaging unit 10 to, for example, a half size in the longitudinal direction and a half size in the lateral direction to form a reduced image I' (x, y).

The reason to reduce the image size is to reduce memory consumption required for executing image processing and to improve the processing speed by making the image size smaller. A reduction rate should be specified by taking conditions for the calculation and resolutions of the image into account, and is therefore not limited to the above value.

Further, reducing the image size may be carried out by thinning pixels of the image, or by averaging the brightness values of neighboring pixels of the image. With this process, the image illustrated in FIG. 7A can be reduced to the image illustrated in FIG. 7B.

Next, in Step S21, the unit 20 sets a processing area, which includes the headlight image of the following vehicle traveling on the same lane $L_2$ as the subject vehicle 5, in the reduced image I' (x, y). Since a position of the headlight image of the following vehicle in the image is predictable, it is possible to regulate (set) the processing area, thereby improving efficiency of the subsequent processes.

Figure 6:
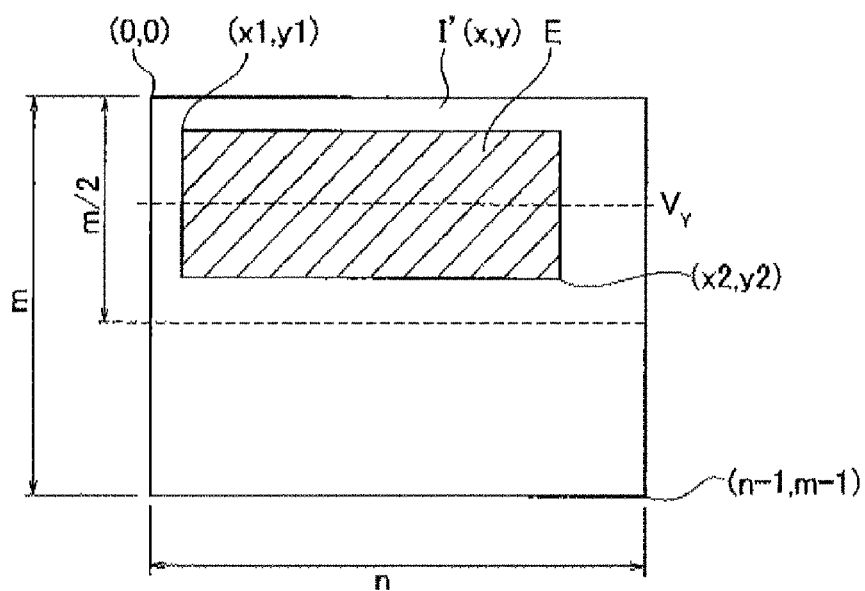
FIG. 6 is an illustration for explaining a range in which the light source area identifying process to calculate the degree of the white turbidity, which is executed by the lens cleaning apparatus according to Embodiment 1 of the present invention.

FIG. 6 shows the processing area E set by the unit 20. As shown, the processing area is set by defining a top left corner as (x1, y1) and a bottom right corner as (x2, y2) in the image with longitudinal pixels n and lateral pixels m.

Positions in the up-and-down direction (perpendicular direction) of the processing area E are defined based on a coordinate in the longitudinal direction $V_Y$ (shown in FIG. 6) of a vanishing point, which corresponds to an infinity point and is obtained in response to the installed position of the imaging unit 10 onto the subject vehicle 5 in the height direction and installed angle of the imaging unit 10 onto the subject vehicle 5 in the longitudinal direction.

Further, positions in the lateral direction of the processing area E are set based on the installed positions of the imaging unit 10 onto the subject vehicle 5 in the lateral direction. The processing area E is set to be left-right symmetric in the reduced image I' (x, y) when the imaging unit 10 is installed to the center of the subject vehicle 5. FIG. 6 shows an example in which the installed positions of the imaging unit 10 to the vehicle 5 are offset to the lateral direction, thereby the processing area E is set to an asymmetrical position. Setting the processing area E can avoid performing the image processing on the entire reduced image I' (x, y), thereby improving the efficiency of the processes.

Figure 7A:
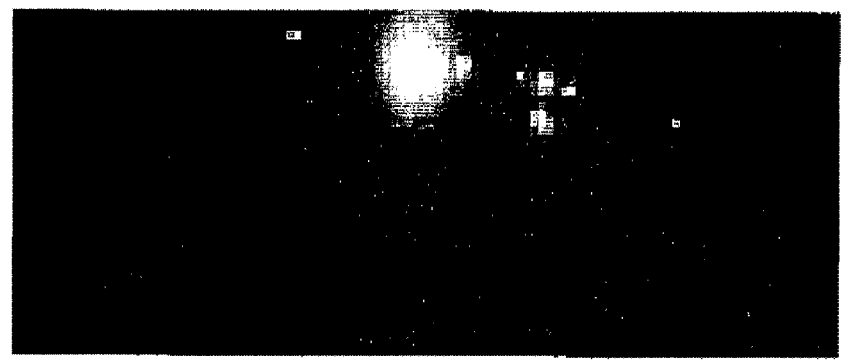
FIG. 7A shows an original image.
Figure 7B:
FIG. 7B shows an image reduced from the original image.
Figure 7C:
FIG. 7C shows a binary image of the reduced image FIG. 7B.

Next, in Step S22, the unit 20 binarizes the reduced image I' (x, y) inside the processing area E, which is set in Step S21, with a predetermined threshold. The threshold is set such that the headlight image of the following vehicle, which is traveling on the same lane $L_2$ as the subject vehicle 5, can be detected. Note that the predetermined threshold is experimentally determined and stored in the unit 20 in advance. With this binarizing process, a binary image illustrated in FIG. 7C is obtained, for example.

Next, in Step S23, the unit 20 performs a labeling process on the binary image obtained in Step S22. The labeling process is a process carried out on the binary image, specifically a process to number each white range forming the binary image.

Next, in Step S24, the unit 20 determines whether a headlight image is included in the labeled image. The process in Step S24 is explained with reference to FIGS. 8A and 8B.

Figure 8A:
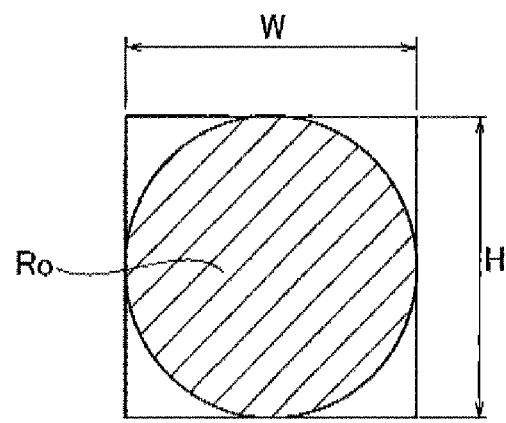
FIG. 8A shows a shape that is identified as a light source area.

The headlight image of the following vehicle, which is traveling on the same lane $L_2$ as the subject vehicle 5, has a substantially circular shape like an area $R_0$ as shown in FIG. 8A. The unit 20 determines whether an area size of each labeled range is equal to or greater than a prescribed area occupancy ratio compared with a rectangular area size HW (H represents pixels in the longitudinal direction and W represents pixels in the lateral direction) that circumscribes the corresponding labeled range, and the unit 20 determines whether a difference between a width of the circumscribed rectangular area and a height thereof is within prearranged ratios.

The determination regarding the area size is expressed by Equation 1, and the determinations regarding the width and the height of the circumscribed rectangular area are expressed by Equation 2.

$$S > HW \times Th_S \quad \text{(Equation 1)}$$

$$W < H \times Th_W \text{ and } H < W \times Th_H \quad \text{(Equation 2)}$$

where S represents the area size, $Th_S$ represents the prescribed area occupancy ratio ($Th_S<1$), $Th_W$ represents one of the prearranged ratio for the width of the circumscribed rectangular area($Th_w>1$), and $Th_H$ represents the other prearranged ratio for the height of the circumscribed rectangular area($Th_H>1$).

Figure 8B:
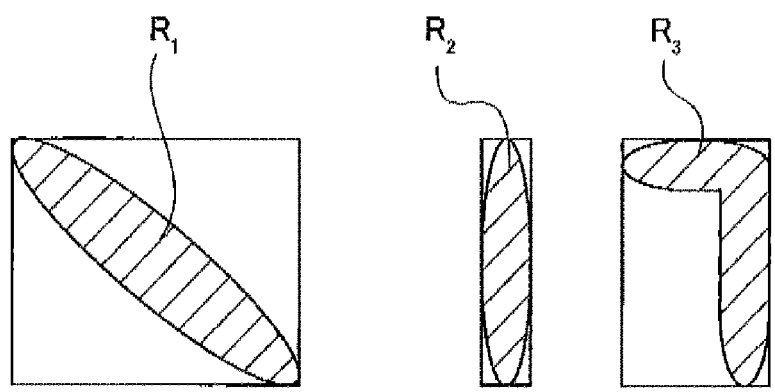
FIG. 8B shows shapes that are not identified as a light source.

With this determination, the unit 20 determines that areas with shapes of such as range $R_1$, $R_2$ and $R_3$ illustrated in FIG. 8B do not represent the headlight image and thus eliminates these areas from the consideration.

Figure 7D:
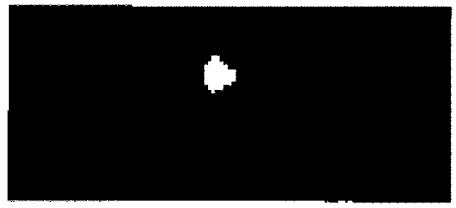
FIG. 7D shows a result obtained by extracting the light source area, which fulfills conditions, from the image FIG. 7C.

Accordingly, an area which fulfills the conditions is selected as shown in FIG. 7D. Note that if more than one area fulfilling the conditions are detected (found), the unit 20 selects an area with the largest area size. When none of area fulfill the conditions (i.e., when the determination in Step S24 is negative), the program returns to the main-routine (FIG. 4).

Next, in Step S25 of FIG. 4, the unit 20 calculates a center of gravity G of the area selected in Step S24. When coordinates of the center of gravity G of the area are expressed as G (Gx, Gy), a position in the right-and-left direction Gx of the center of gravity G is calculated by dividing a sum of coordinates in the right-and-left direction of all the pixels in the selected area by the area size. A position in the up-and-down direction Gy of the center of gravity G is calculated by dividing a sum of coordinates in the up-and-down direction of all the pixels in the selected area by the area size. Then, the program finishes the FIG. 5 flowchart and returns to the main routine (FIG. 4).

Figure 9:
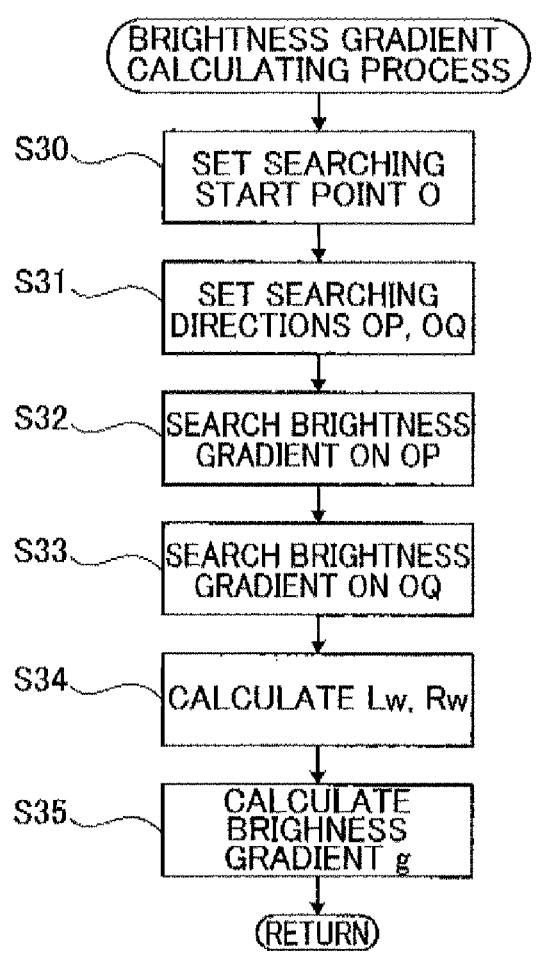
FIG. 9 is a flowchart of brightness gradient calculating process, which is executed by the lens cleaning apparatus according to Embodiment 1 of the present invention, to calculate the degree of the white turbidity.
Figure 10:
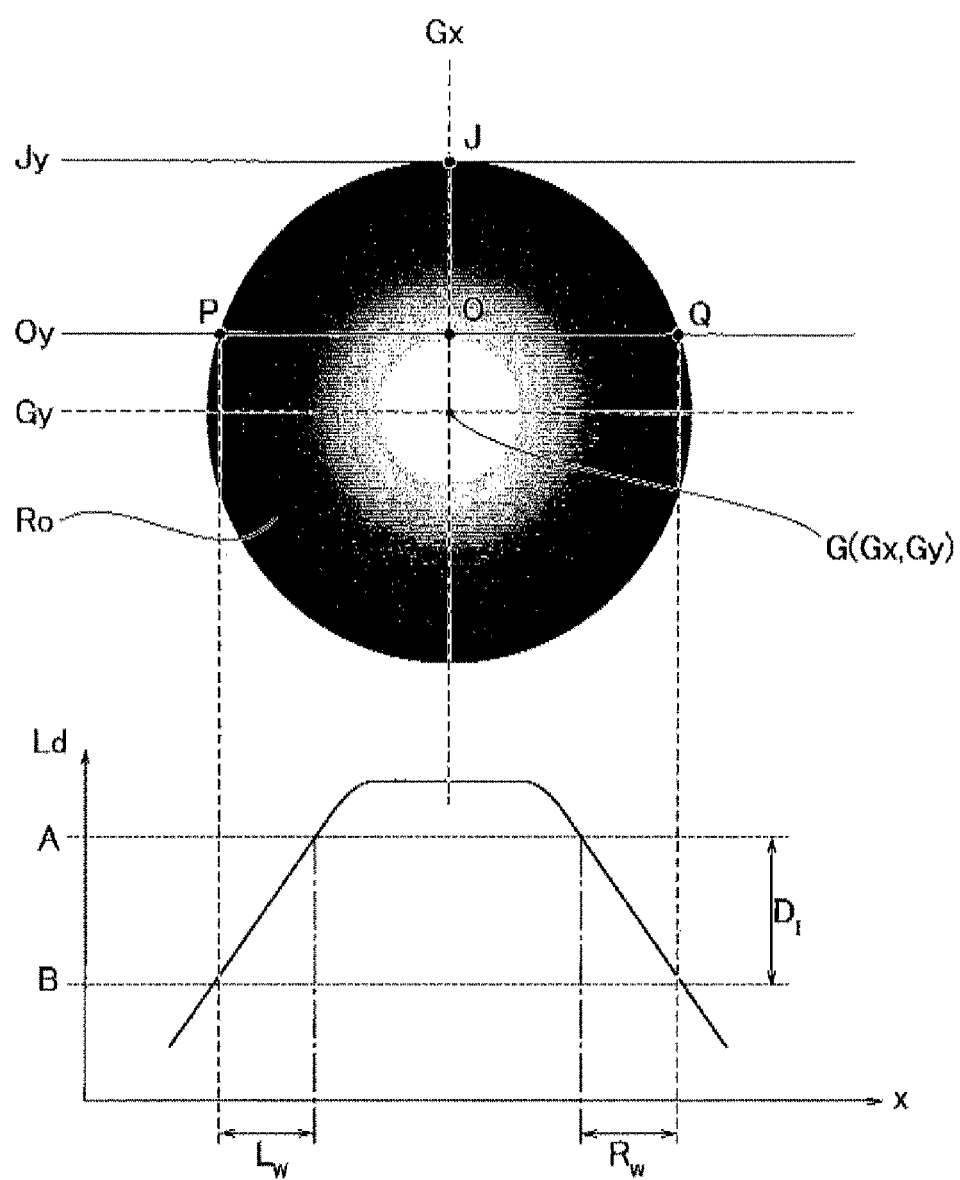
FIG. 10 is illustrations for explaining an example of predetermined lines used for calculating the brightness gradient to calculate the degree of the white turbidity by the lens cleaning apparatus according to Embodiment 1 of the present invention and an example of the brightness gradient.

Next, the process in Step S15, i.e., the brightness gradient calculating process, is explained with reference to FIGS. 9 and 10. FIG. 9 is a flowchart showing the process of the brightness gradient calculating process executed by the brightness gradient calculating unit 30. FIG. 10 shows an illustration for explaining an example of the predetermined lines used for calculating the brightness gradient and an example of the brightness gradient calculated based on the predetermined lines.

First, in Step S30 of FIG. 9, the brightness gradient calculating unit 30 sets or decides a searching start point O, which is used to calculate the brightness gradient g, in the reduced image I' (x, y). In Step S31, the unit 30 decides searching directions (lines) to calculate the brightness gradient g. The searching start point O and the lines (directions) can be decided and set based on experimental results such that the point and lines are less affected by water splashed by the subject vehicle 5, reflection of the headlight of a following vehicle on the road surface, the headlight of a vehicle traveling on an adjacent lane, or the like.

In this embodiment, the searching start point O is set to calculate the brightness gradient g at a point between the center of gravity G of the area $R_0$ and the upper end point J in the area $R_0$ as shown in FIG. 10.

Specifically, the up-and-down direction coordinate Oy of the searching start point O is decided by Equation 3:

$$Oy = Jy + (Gy - Jy)/Th_y \quad \text{(Equation 3)}$$

where Jy represents the up-and-down direction coordinate of the upper end point J in the area $R_0$, and the threshold value $Th_y$ is greater than 0. The threshold value $Th_y$ is decided based on an experiment, etc.

As shown in FIG. 10, lines, which are parallel to a horizontal line passing through the center of gravity G of the area $R_0$, are set as the predetermined lines OP and OQ.

Next, in Step S32, the unit 30 successively obtains brightness values of the reduced image I' (x, y) from the searching start point O to a point P on the line OP, and calculates the brightness distribution Ld.

Further, in Step S33, the unit 30 successively obtains brightness values of the reduced image I' (x, y) from the searching start point O to a point Q on the line OQ, and calculates the brightness distribution Ld.

A graph of the calculated brightness distributions Ld is shown in FIG. 10. The brightness distribution Ld on the line OP and the brightness distribution on the line OQ are shown in one graph for convenience of the explanation.

Next, in Step S34, the unit 30 calculates the width of the brightness distribution Ld. A threshold value A and a threshold value B for the brightness values are set in advance. The unit 30 searches the brightness distribution Ld from the searching start point O to the point P in the left direction and calculates the width (interval) from a point where the brightness value becomes smaller than the threshold value A to a point where the brightness value becomes smaller than the threshold value B as pixel number in the right-left direction $L_W$. Also, the unit 30 searches the brightness distribution Ld from the searching start point O to the point Q in the right direction and calculates the width (interval) from a point where the brightness value becomes smaller than the threshold value A to a point where the brightness value becomes smaller than the threshold value B as pixel number in the right-and-left direction $R_W$.

Although not shown in FIG. 9, the unit 30 determines a presence of another light source image and terminates the process to search the brightness values if the read (searched) brightness value exceeds the threshold value A after falling below the threshold value A or if a difference between two consecutive read brightness values exceeds a threshold value C while searching the brightness values along the line OP or OQ. When the unit 30 terminates the process to search the brightness values, the program returns to the main routine (FIG. 4) such that a next image is inputted from the imaging unit 10.

Next, in Step S35, the unit 30 calculates the brightness gradient g. Specifically, the unit 30 calculates the brightness gradient g on the line OP as $D_I/L_W$, where $D_I$ represents a difference between the threshold values A and B (i.e., $D_I$=A−B). On the other hand, the unit 30 calculates the brightness gradient g on the line OQ as $-D_I/R_W$. Then, the unit 30 finishes the process in FIG. 9 and returns to the main routine (FIG. 4).

Figure 11:
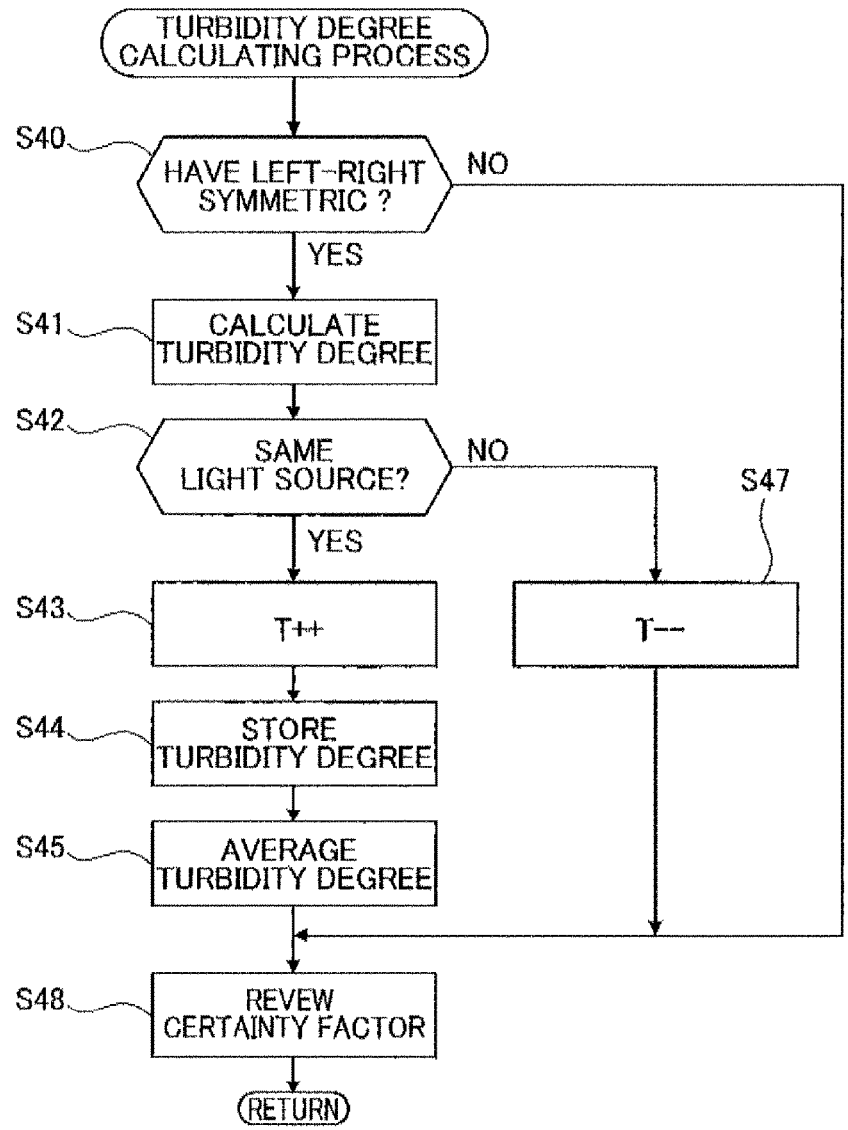
FIG. 11 is a flowchart for calculating the degree of the white turbidity executed by the lens cleaning apparatus according to Embodiment 1 of the present invention.
Figure 12:
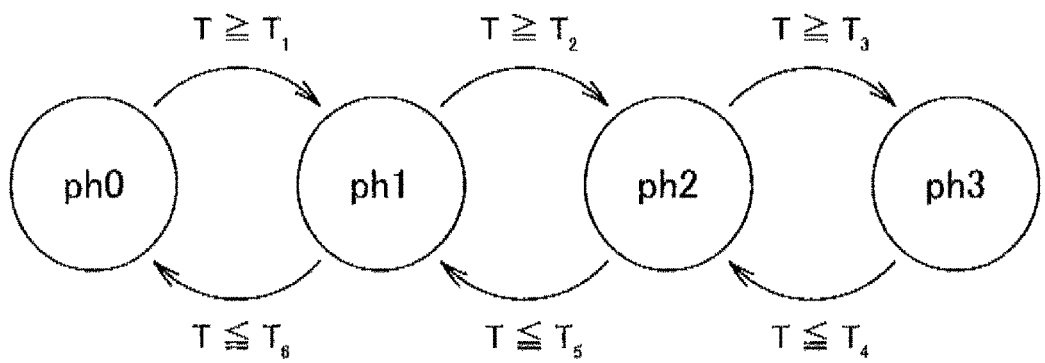
FIG. 12 is an illustration for explaining state transitions which show changes in a certainty factor of the degree of the white turbidity in the lens cleaning apparatus according to Embodiment 1 of the present invention.

Next, the process in Step S16 of FIG. 4, i.e., the turbidity calculating process, is explained with reference to FIGS. 11 and 12. FIG. 11 is a flowchart showing the turbidity calculating process executed by the turbidity calculating unit 40. FIG. 12 is an illustration for explaining state transitions which show changes in a certainty factor of the degree of the white turbidity.

First, in Step S40, the unit 40 determines whether the right brightness gradient and left brightness gradient g in the area $R_0$, i.e., $D_I/L_W$ and $-D_I/R_W$, are symmetry. The symmetry is determined by confirming whether a gap $G_I$ between the brightness gradients g calculated by Equation 4 is equal to or smaller than a predetermined threshold gap $Th_G$.

$$G_I=(|L_W|-|R_W|)/(|L_W|+|R_W|) \quad \text{(Equation 4)}$$

When a plurality of areas including a light source image successively appear in the right-and-left direction, the calculated brightness gradients g on the right direction and left direction become different, i.e., the gap $G_I$ calculated by Equation 4 is greater than the predetermined threshold gap $Th_G$. When the gap $G_I$ is greater than the predetermined threshold gap, the program proceeds to Step S48 without calculating the degree of white turbidity.

Next, in Step S41, the unit 40 calculates the degree of the white turbidity U on the lens 12. The degree of the white turbidity U is, as expressed by Equation 5, calculated as an average of inverse numbers of the right and left brightness gradients g (i.e., $D_I/L_W$ and $-D_I/R_W$).

$$U=\{(L_W/D_I)+(R_W/D_I)\}/2 \quad \text{(Equation 5)}$$

In Equation 5, the brightness gradients g are inversed and averaged such that a value of the degree of the white turbidity U becomes larger as the degree of the white turbidity on the lens 12 is higher (i.e., as the lens 12 is dirtier). This process is carried out by the brightness gradient average value calculating unit 42 shown in FIG. 2.

Next, in the Step S42, the unit 40 determines whether the area $R_j$ identified in this routine is the same as the area $R_0$ identified in the last routine. In other words, the unit 40 determines whether the identified areas represent the same light source.

This determination is made by comparing the latest degree of the white turbidity U calculated by Equation 5 to an average value Ave (U) of the degree of the white turbidity U calculated in previous routines. The unit 40 determines that the areas $R_0$ are generated in response to the same light source image when a difference between the latest degree of the white turbidity and the average value Ave (U) is small.

This process is carried out by the similarity calculating unit 44. Specifically, the similarity calculating unit 44 determines that the arears are generated in response to the same light source image when Equation 6 is fulfilled:

$$Th_{LOW}<U/\text{Ave}(U)<Th_{HIGH} \quad \text{(Equation 6)}$$

where $Th_{LOW}$ represents a minimum threshold value for determining to be the same light source image and $Th_{HIGH}$ represents a maximum threshold value for determining to be the same light source image.

When it is determined that the areas $R_0$ are generated in response to the same light source image in Step S42, the program proceeds to Step S43, in which the total number of times T is incremented. The total number of times T represents the consecutive number of identifying images as the same light source image. The program then proceeds to Step S44. The processes after Step S43 are carried out by the certainty factor determining unit 46, and the total number of times T incremented in Step S43 is stored in the certainty factor determining unit 46 as needed.

On the other hand, when it is determined that the areas $R_0$ are not generated in response to the same light source image in Step S42, the total number of times T is decremented in Step S47, and the program proceeds to Step S48. The process in step S47 is carried out by the certainty factor determining unit 46, and the total number of times T decremented in Step S47 is stored in the certainty factor determining unit 46 as needed.

Next, in Step S44, the degree of the white turbidity U calculated in Step S41 is stored in the certainty factor determining unit 46.

Next, in Step S45, the unit 40 calculates the average value Ave (U) of the degree of the white turbidity U calculated in Step S41 and updates the value. The updated average value Ave (U) is stored in the certainty factor determining unit 46.

Next, in Step S48, the unit 40 determines the certainty factor F of the degree of the white turbidity U. The certainty factor F is expressed with the total number of times T. Specifically, the certainty factor F is determined to be higher as the total number of times T is greater, i.e., the unit 40 determines that the certainty factor F is high in response to the degree of the white turbidity U, which is calculated based on the brightness gradient g of the images with the same light source successively identified.

In this embodiment, the certainty factor F is classified into four levels (Ph0, Ph1, Ph2, and Ph3). Each of the certainty factors (level) F changes the state according to a value of the T.

To be specific, as shown in FIG. 12, the certain factor F is Ph0 in a first state. When the total number of times T, which represents the consecutive number of identifying the images including the same light source image, exceeds a prearranged first value T1, the certainty factor F is changed to a level Ph1. The certainty factor F is changed to a level Ph2 when the total number of times T exceeds a prearranged second value T2, and is changed to a level Ph3 when the certainty factor F exceeds a prearranged third value T3.

The certainty factor F is changed to a level Ph2 when the certainty factor F has been Ph3 and the total number of times T falls below a prearranged fourth value T4 after the total number of times T is decremented. The certainty factor F is changed to a level Ph1 when the total number of times T falls below a prearranged fifth value T5. The certainty factor F is changed to a level Ph0 when the total number of times T falls below a prearranged sixth value T6.

To prevent the certainty factor F from returning to the previous level i.e., to avoid a hunting soon after the certainty factor F is changed to another level, the unit 40 adds a first predetermined offset value $Tc_1$ to the total number of times T when the certainty factor F is changed to a higher level. On the other hand, the unit 40 may subtract a second predetermined offset value $Tc_2$ from the total number of times T when the certainty factor F is changed to a smaller level. When the certainty factor F is updated, the program finishes the FIG. 11 process and returns to the main routine (FIG. 4).

Although not illustrated in FIG. 11, if the unit 40 determines that the right brightness gradient and left brightness gradient g in the area $R_0$ lack symmetry in Step S40, the unit 40 may decrement the total number of times T in Step S48.

When the program returns to the main routine (FIG. 4), in Step S17 of FIG. 4, the turbidity informing unit 50 informs the auto-cleaning determining unit 62 and approaching vehicle detecting unit 100 about the degree of the white turbidity U on the lens 12 and the certainty factor F calculated in Step S16.

Next, the process in Step S18 of FIG. 4, i.e., the lens cleaning control, is explained in details with reference to FIGS. 13A to 20.

First, the configuration of the lens cleaning unit 70 is explained with reference to FIGS. 13A and 13B.

Figure 13A:
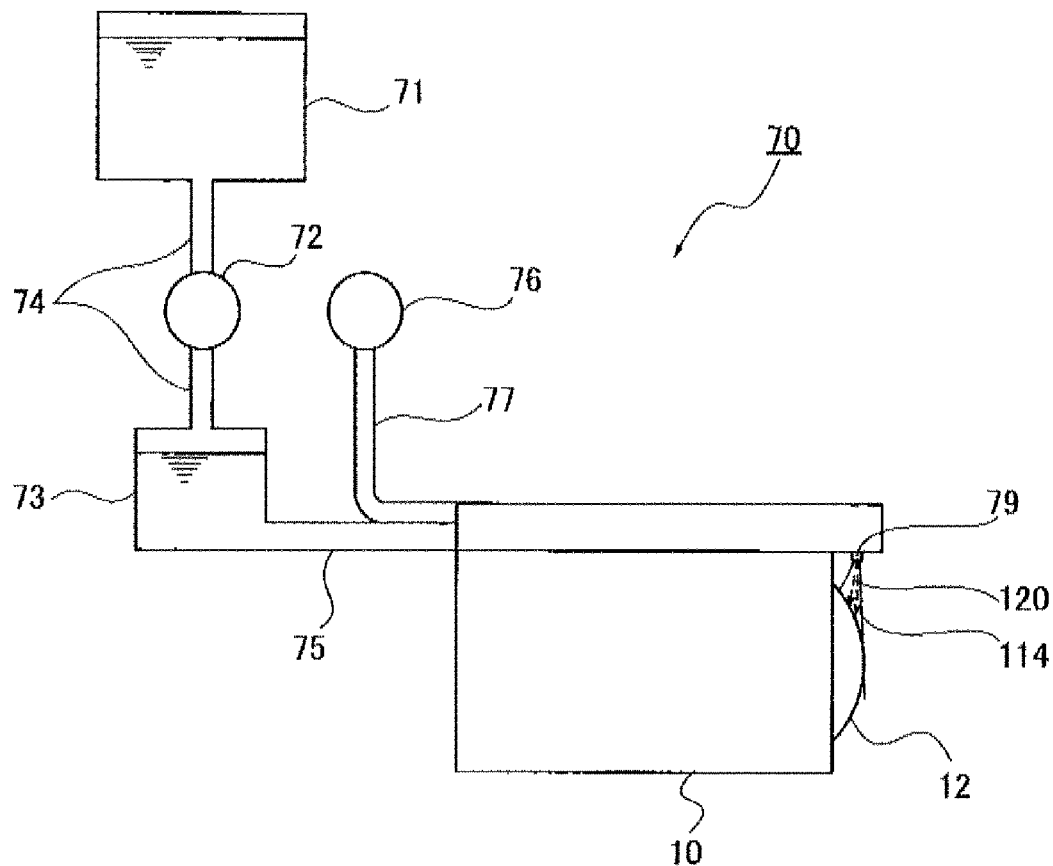
FIG. 13A is a schematic diagram showing a detailed configuration of a lens cleaning part of the lens cleaning apparatus according to Embodiment 1 of the present invention.

The lens cleaning unit 70 is configured to spay cleaning fluid 114 and compressed air 120 onto the surface of the lens 12 from a cleaning nozzle 79 installed to a housing of the imaging unit 10, as illustrated in FIG. 13A.

The cleaning fluid 114 is also used as windshield washer fluid of the subject vehicle 5 and stored in a main washer-fluid reservoir 71. A required amount of the cleaning fluid 114 used for cleaning the lens 12 is delivered to a sub washer-fluid reservoir 73 through a first cleaning-fluid flow pass 74 by a washer pump 72.

Further, the compressed air 120 compressed (pressurized) by an air pump 76 is delivered through an air flow path 77 to and sprayed from a cleaning nozzle 79 at pressure set according to driving force of the air pump 76.

When the compressed air 120 is sprayed from the cleaning nozzle 79, the cleaning fluid 114 in a second cleaning fluid flow pass 75 is sucked out by the compressed air 120 sprayed from the cleaning nozzle 79, i.e., the cleaning fluid 114 is sprayed from the cleaning nozzle 79 together with the compressed air 120.

Figure 13B:
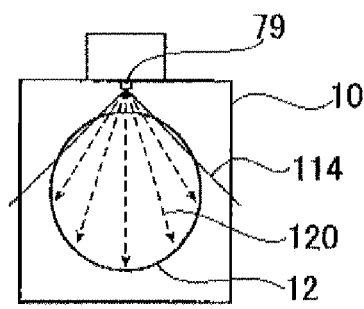
FIG. 13B is a view showing FIG. 13A from the right-side of the paper.

FIG. 13B illustrates the FIG. 13A from the right-side of the paper, i.e., a front view of the lens 12. As illustrated in FIG. 13B, the cleaning fluid 114 and compressed air 120 is sprayed to covers the whole surface of the lens 12.

Next, cleaning methods (cleaning modes) for cleaning the lens 12 with the lens cleaning unit 70 is explained with reference to FIGS. 14A to 14C.

Figure 14A:
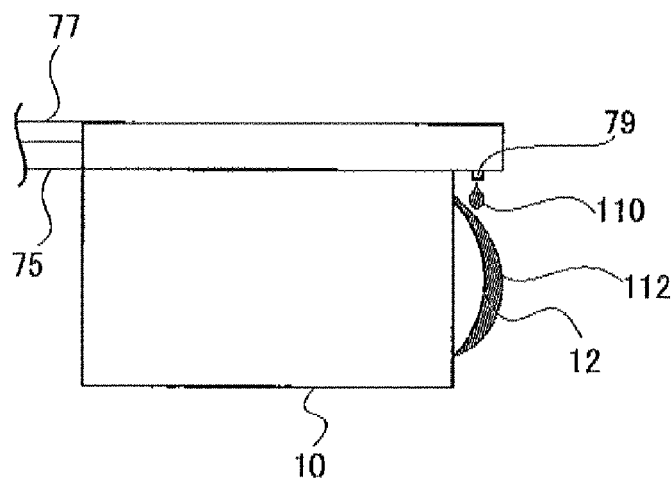
FIG. 14A shows a cleaning mode which drips a drop of cleaning fluid on the lens surface to form a film of the cleaning fluid on the lens surface.

FIG. 14A illustrates a cleaning mode in which the lens cleaning unit 70 drips a drop 110 of the cleaning fluid on the surface of the lens 12 from the cleaning nozzle 79 to form a film 112 of the cleaning fluid 114 on the lens surface. This cleaning mode is performed when the degree of the white turbidity U is within between a first predetermined turbidity degree a1, which is set at a relatively small value, and a second predetermined turbidity degree a2, which is set greater than the first predetermined turbidity degree a1. By dripping the cleaning fluid to form the film 112 of the cleaning fluid 114 on the surface of the lens 12, a visual field of the imaging unit 10 becomes clear. Hence, the imaging unit 10 can take a sufficiently clear image I (x, y) for detecting an approaching vehicle.

As explained with reference to FIGS. 13A and 13B, dripping the cleaning fluid 114 is performed after the cleaning fluid 114 is delivered to the sub washer-fluid reservoir 73 from the main washer-fluid reservoir 71 by driving the washer pump 72. Dripping the cleaning fluid 114 is thus performed by driving the air pump 76 at a small driving force for a preset short time to spray the compressed air 120 from the cleaning nozzle 79 at a small pressure, such that the cleaning fluid 114 in the second cleaning fluid flow pass 75 is sucked out in a drop-shape and the sucked-drop 110 of the cleaning fluid is dripped on the lens 12.

Figure 14B:
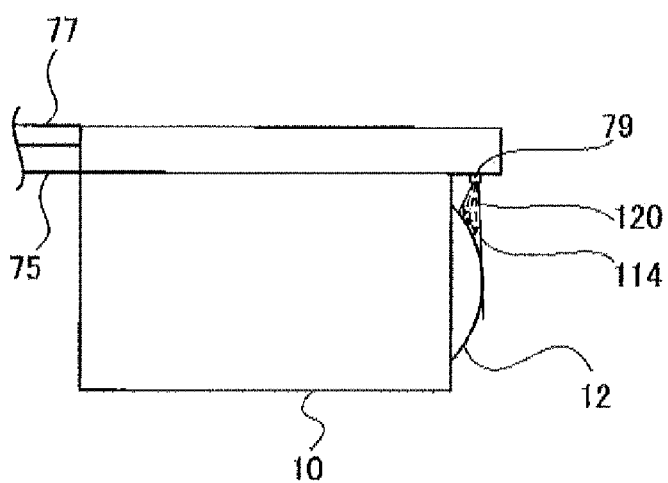
FIG. 14B shows a cleaning mode which sprays the cleaning fluid together with compressed air onto the lens surface.

FIG. 14B illustrates a cleaning mode (high-pressure cleaning mode) in which the lens cleaning unit 70 sprays the cleaning fluid 114 together with the compressed air 120 onto the surface of the lens 12 from the cleaning nozzle 79. This cleaning mode is performed when the degree of the white turbidity U is greater than the second predetermined turbidity degree a2. By performing this cleaning mode (high-pressure cleaning mode), the white turbidity on the lens surface should be cleaned out. Consequently, the visual field of the imaging unit 10 becomes clear, and the imaging unit 10 can take a sufficiently clear image I (x, y) for detecting an approaching vehicle.

As explained with reference to FIGS. 13A and 13B, the high-pressure cleaning mode is performed by driving the air pump 76 for a preset time after the cleaning fluid 114 is delivered to the sub washer-fluid reservoir 73 from the main washer-fluid reservoir 71 by driving the washer pump 72.

Figure 14C:
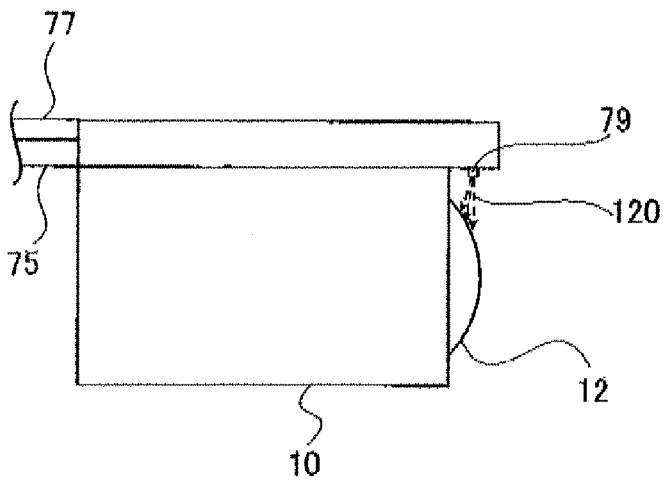
FIG. 14C shows a cleaning mode which sprays the compressed air on the lens surface.

FIG. 14C illustrates a cleaning mode (air cleaning mode) in which the cleaning unit 70 sprays the compressed air 120 on the surface of the lens 12 from the lens cleaning nozzle 79. This cleaning mode is performed to blow away a drop of water on the surface of the lens 12 by the compressed air 120 when the degree of the white turbidity U is equal to or smaller than the first predetermined turbidity degree a1 (i.e., when the turbidity degree is small). By performing this cleaning mode (air cleaning mode), the drop of water on the lens surface should be cleaned out. Consequently, the visual field of the imaging unit 10 becomes clear, and the imaging unit 10 can take a sufficiently clear image I (x, y) for detecting the approaching vehicle.

As explained with reference to FIGS. 13A and 13B, the air cleaning mode is performed by driving the air pump 76 for a preset time after emptying the sub washer-fluid reservoir 73.

Next, process for selecting the cleaning mode and operation of the air pump 76 and washer pump 72 in each cleaning mode is explained with reference to FIG. 15. FIG. 15 shows selections of the cleaning modes, parameters for determining a system error of the BSW system 9 caused by a high degree of the white turbidity U, and ranges of those parameters.

As shown in FIG. 15, the cleaning modes and system error are selected or determined based on the degree of the white turbidity U, the certainty factor F of the turbidity degree, counter values for duration time (C1, C2, C3, C0, and counter valued for the number of performing times of the cleaning (n1, n2, n3). The thresholds, shown in FIG. 15, used for changing the cleaning mode are respectively set in advance according to experimental results, etc.

Further, driving time period Tap1, Tap2, Tap3 of the air pump 76 and driving time period Twp1, Twp2, Twp3 of the washer pump 72 are also defined therein.

Figure 16:
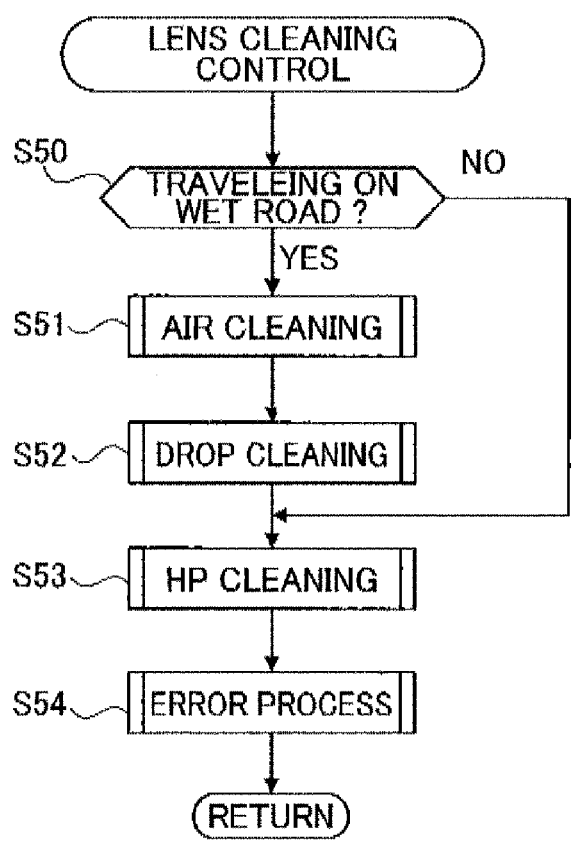
FIG. 16 is a flowchart of lens cleaning process executed by the lens cleaning control unit of the lens cleaning apparatus according to Embodiment 1 of the present invention.

Next, the process of Step S18 in FIG. 4, i.e., the lens cleaning control process, is explained with reference to FIGS. 16 to 20. FIG. 16 is a flowchart showing the process of the lens cleaning control executed by the lens cleaning unit 60. FIGS. 17 to 20 are subroutine flowcharts of FIG. 16 flowchart and show the processes of the lens cleaning control corresponding to the cleaning modes respectively.

First, an overall process is explained with reference to FIG. 16. In Step S50, the auto-cleaning deciding unit 62 determines whether a wiper of the subject vehicle 5 is being used based on an operational signal of the subject vehicle 5 acquired by the vehicle information acquisition unit 80. When it is determined that the wiper is being used, the unit 62 determines that the subject vehicle 5 is now traveling on a wet road, and the program proceeds to Step S51. On the other hand, when it is determined that the wiper is not being used, the unit 60 determines that the subject vehicle 5 is traveling on a dry road, and the program then proceeds to S53.

Next, in Step S51, the auto-cleaning deciding unit 62 decides whether the air cleaning mode should be performed. When the conditions for the air cleaning mode are fulfilled, the cleaning unit 60 performs the air cleaning mode. The details will be explained later.

Next, in Step S52, the auto-cleaning unit 62 decides whether dripping a drop of the cleaning fluid on the lens 12 (drop cleaning) should be performed. When the conditions for the drop cleaning mode are fulfilled, the lens cleaning unit 60 performs the drop cleaning mode. The details of this process will be explained later.

Next, in Step S53, the auto-cleaning unit 62 decides whether the high-pressure cleaning mode should be performed. When the conditions for the high-pressure cleaning mode are fulfilled, the lens cleaning unit 60 performs the high-pressure cleaning mode. The details of this process will be explained later.

Note that if the auto-cleaning deciding unit 62 determines that the subject vehicle 5 is traveling on a dry road, the cleaning unit 60 performs neither the air cleaning mode nor the drop cleaning mode, but performs the high-pressure cleaning mode.

That is to say, if dripping the cleaning fluid 114 is performed on a dry road, the surface of the lens 12 as well as a bumper, etc. of the subject vehicle 5 get wet. Further, it may be difficult to dry the dropped cleaning fluid 114. Therefore, the lens cleaning unit 60 performs the high-pressure cleaning mode to blow out the cleaning fluid 114 attached on other than the lens surface.

Next, in Step S54, the system error determining unit 64 determines whether or not to terminate (stop) the operation of the system (in this embodiment, the BSW system 9). When it is determined that the degree of the white turbidity U is so high that the white turbidity cannot be removed by the lens cleaning or that the degree of the white turbidity U does not improve even after repeating the cleaning by prescribed times, the unit 64 stops the operation of the BSW system 9. The details of this process will be explained later.

When Step S54 is finished, the program returns to the main routine (FIG. 4).

Next, the detailed process of the cleaning modes is explained with reference to FIG. 17 to FIG. 20 respectively.

Figure 17:
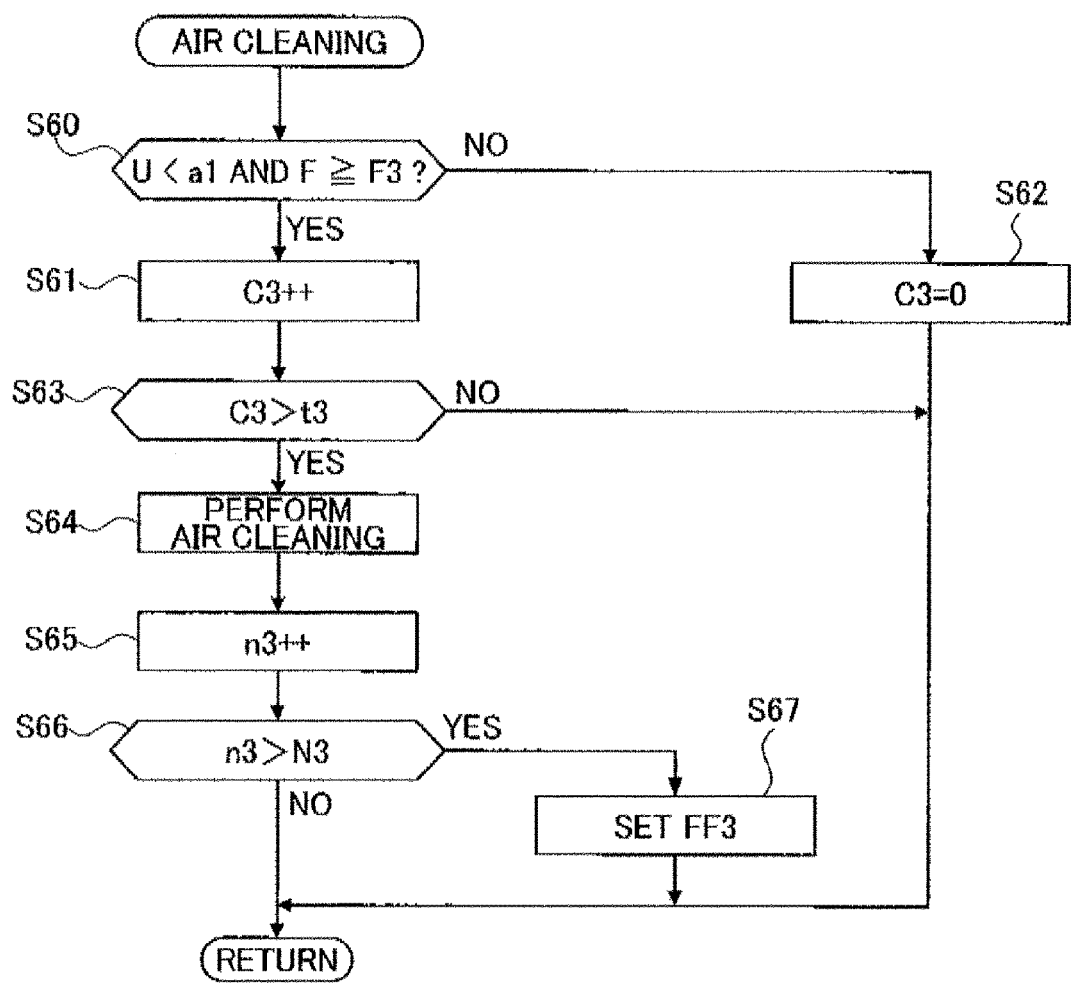
FIG. 17 is a flowchart of process executed by the lens cleaning control unit of the lens cleaning apparatus according to Embodiment 1 of the present invention to perform air cleaning.

First, the air cleaning process is explained with reference to FIG. 17.

In Step S60, it is determined whether the degree of the white turbidity U is less than the first predetermined turbidity degree a1 and the certainty factor F is equal to or greater than the third predetermined factor F3. When the result is affirmative, the program proceeds to Step S61. When the result is negative, the program proceeds to Step S62.

In Step S61, a counter value for duration time C3 is incremented.

In Step S62, the counter value for duration time C3 is reset.

Next, in Step S63, it is determined whether the counter value C3 is greater than a third predetermined counter value t3.

When the result is C3>t3, the program proceeds to Step S64, in which the lens cleaning unit 60 performs the air cleaning mode. On the other hand, if the result is not C3>t3, the program returns to the main routine shown in FIG. 16.

Next, in Step S65, the counter value for the number of performing times of the air cleaning n3 is incremented.

Further, in Step S66, it is determined whether the counter value for the number of performing times of the air cleaning n3 is greater than a third predetermined number N3. When the counter value n3 is greater than the third predetermined number N3, the program proceeds to Step S67. Otherwise, the program returns to the main routing shown in FIG. 16.

In Step S67, i.e., when the counter value for the number of performing times of the air cleaning n3 exceeds the third predetermined number N3, it is determined that the white turbidity cannot be removed even after repeating the air cleaning by prescribed times and sets a third fail (error) flag FF3. Then, the program returns to the main routine shown in FIG. 16.

Figure 18:
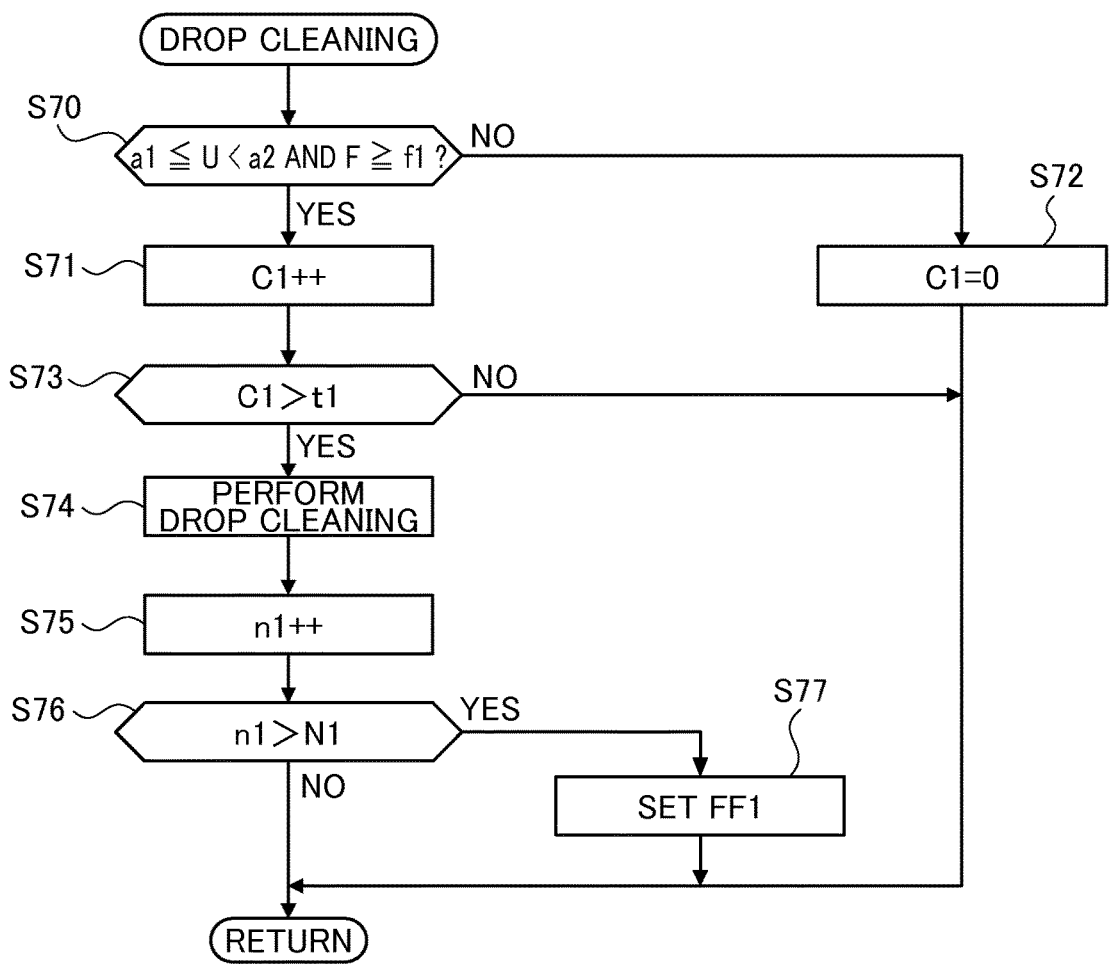
FIG. 18 is a flowchart of process executed by the lens cleaning control unit of the lens cleaning apparatus according to Embodiment 1 of the present invention to perform drop cleaning.

Next, drop cleaning process is explained with reference to FIG. 18.

First, in Step S70, it is determined whether the degree of the white turbidity U is equal to or greater than the first predetermined turbidity degree a1 and is less than the second predetermined turbidity degree a2, as well as whether the certainty factor F is equal to or greater than a first predetermined factor value F1. When the result is affirmative, the program proceeds to Step S71. When the result is negative, the program proceeds to Step S72.

In Step S71, a counter value for the duration time C1 is incremented.

In Step S72, the counter value for the duration time C1 is reset.

Next, in Step S73, it is determined whether the counter value C1 is greater than a first predetermined counter value t1.

When the result is C1>t1, the program proceeds to Step S74, in which the lens cleaning unit 60 performs the drop cleaning. On the other hand, when the result is not C1>t1, the program returns to the main routine shown in FIG. 16.

Next in Step S75, the counter value for the number of performing times of the drop cleaning n1 is incremented.

Further, the program proceeds to Step S76, in which it is determined whether the counter value for the number of performing times of the drop cleaning n1 is greater than a first predetermined number N1. When the counter value n1 is greater than the first predetermined number N1, the program proceeds to Step S77. Otherwise, the program returns to the main routine shown in FIG. 16.

In Step S77, i.e., when the counter value for the number of performing times of the drop cleaning n1 exceeds the first predetermined number N1, it is determined that the white turbidity cannot be removed even after repeating the drop cleaning by prescribed times and sets a first fail (error) flag FF1. Then, the program returns to the main routine shown in FIG. 16.

Figure 19:
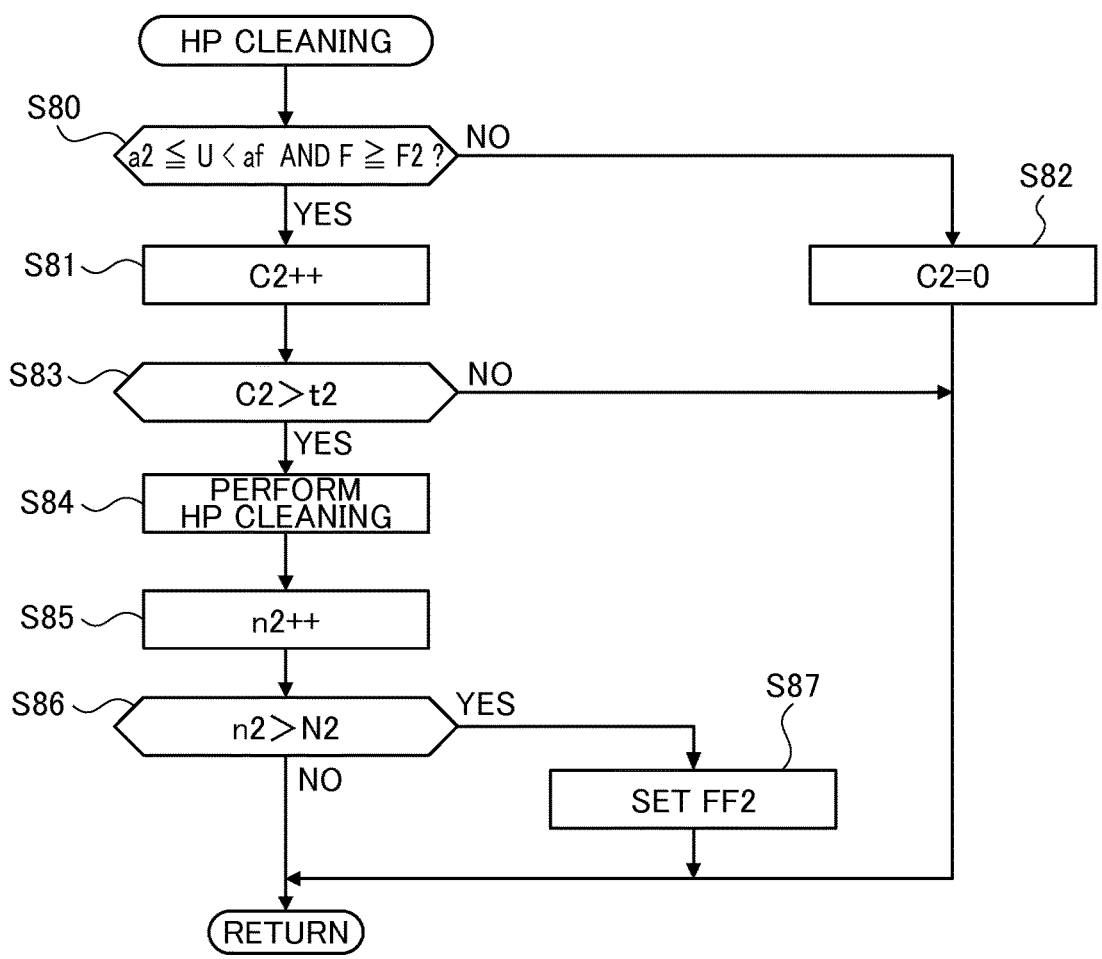
FIG. 19 is a flowchart of process executed by the lens cleaning control unit of the lens cleaning apparatus according to Embodiment 1 of the present invention to perform high pressure cleaning.

Next, the high-pressure cleaning process is explained with reference to FIG. 19.

First, in Step S80, it is determined whether the degree of the white turbidity U is equal to or greater than the second predetermined turbidity degree a2 and less than a predetermined turbidity degree af, as well as the certainty factor F is equal to or greater than the second predetermined factor F2. When the result is affirmative, the program proceeds to Step S81. When the result is negative, the program proceeds to Step S82.

In Step S81, a counter value for the duration time C2 is incremented.

In Step S82, the counter value for the duration time C2 is reset.

Next, in Step S83, it is determined whether the counter value C2 is greater than a second predetermined counter value t2.

When the result is C2>t2, the program proceeds to Step S84, in which the lens cleaning unit 60 performs the high-pressure cleaning mode on the lens 12. On the other hand, when the result is not C2>t2, the program returns to the main routine shown in FIG. 16.

Next in Step S85, the counter value for the number of performing times of the high-pressure cleaning n2 is incremented.

Further, the program proceeds to Step S86, in which it is determined whether the counter value for the number of performing times of the high-pressure cleaning n2 is greater than a second predetermined number N2. When the counter value n2 is greater than the second predetermined number N2, the program proceeds to Step S87. Otherwise, the program returns to the main routine shown in FIG. 16.

In Step S87, i.e., when the counter value for the number of performing times of the high-pressure cleaning n2 exceeds the second predetermined number N2, it is determined that the white turbidity cannot be removed even after repeating the high-pressure cleaning by prescribed times and sets a second fail (error) flag FF2. Then, the program returns to the main routine shown in FIG. 16.

Figure 20:
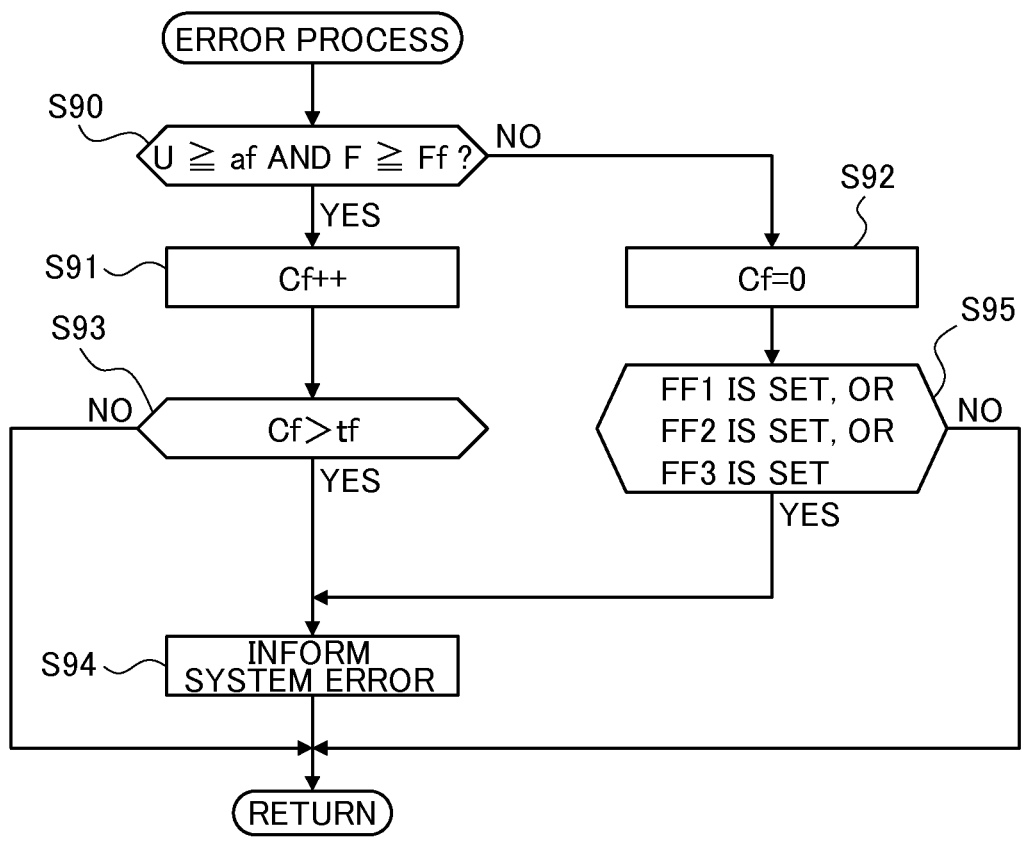
FIG. 20 is a flowchart executed by a system error determination unit of the lens cleaning apparatus according to Embodiment 1 of the present invention.

Next, a fail or error process is explained with reference to FIG. 20.

First, in Step S90, it is determined whether the degree of the white turbidity U is equal to or greater than the predetermined turbidity degree af, and the certainty factor F is equal to or greater than the predetermined factor Ff. When the result is affirmative, the program proceeds to Step S91. When the result is negative, the program proceeds to Step S92.

In Step S91, a counter value for duration time Cf is incremented.

In Step S92, the counter value for duration time Cf is reset.

Next, in Step S93, it is determined whether the counter value for duration time Cf is greater than a predetermined counter value tf.

When the result is cf>tf, the program proceeds to Step S94, in which the system error determining unit 64 informs the approaching vehicle detecting unit 100 that a system error occurs. In contrary, when the result is not cf>tf, the program returns to the main routine shown in FIG. 16.

In Step S95, statuses of the first fail flag FF1, the second fail flag FF2, and the third fail flag FF3 are checked. When it is determined that any one of the fail flags FF1, FF2, and FF3 is set, the program proceeds to Step S94.

On the other hand, when it is determined that none of the fail flags are set, the program returns to the main routine of the lens cleaning control shown in FIG. 16, and further returns to the main routine according to this embodiment shown in FIG. 4.

Next, in Step S19 of FIG. 4, the approaching vehicle detecting unit 100 and the warning output unit 90 control the operation of the BSW system 9. Specifically, when the lens cleaning control unit 60 determines that the system error occurs, the units 100 and 90 change or transit the state of the BSW system 9 to a fail state. Then, function of the approaching vehicle detecting unit 100 and warning output unit 90 is terminated, and the information output unit 85 or the warning output unit 90 informs the occupants of the subject vehicle 5 that the BSW system 9 is changed to the fail state using a display, indicator, etc.

Note once the state of the BSW system 9 is changed to the fail state, the apparatus activates a preinstalled timer and maintains the fail state for a certain period of time.

When the lens cleaning control unit 60 determines that the conditions of the system error does not occur, i.e., when it is determined that the white turbidity on the lens 12 is removed by the cleaning process, the BSW system 9 continues a normal operation.

Here, controlling the operation of the BSW system 9 is not limited to changing the state into the system fail state. Precisely, when the degree of the white turbidity U on the lens 12 is relatively high, the approaching vehicle detecting unit 100 may decrease a threshold of edge detection in imaging processing. With this, even if the detected edge points of the other vehicle 6 has a distortion and/or blur due to the decrease in the contrast caused by the white turbidity on the lens 12, it becomes possible to detect the edge points accurately.

As explained above, the turbidity degree calculating unit 40 calculates the degree of the white turbidity U on the surface of the lens 12 based on the brightness gradient g in the image I (x, y), and the lens cleaning control unit 60 sets or select the cleaning mode for spraying the cleaning fluid 114 or the compressed air 120 based on the calculated degree of the white turbidity U. However, process for calculating the degree of the white turbidity U on the surface of the lens 12 should not be limited to the process based on the brightness gradient g.

For example, the turbidity degree calculating unit 40 can calculate the degree of the white turbidity U on the surface of the lens 12 based on a distribution of detected edge strengths in the image I (x, y).

As is known, when white turbidity occurs on the surface of the lens 12, the image I (x, y) becomes unclear. The degree of this unclearness becomes greater as the degree of the white turbidity U becomes greater. Therefore, the degree of the unclearness can be calculated based on the distribution of the edge strengths in the image I (x, y).

A process to calculate the degree of the white turbidity U based on the distribution of the edge strengths is explained with reference to some drawings.

Figure 21:
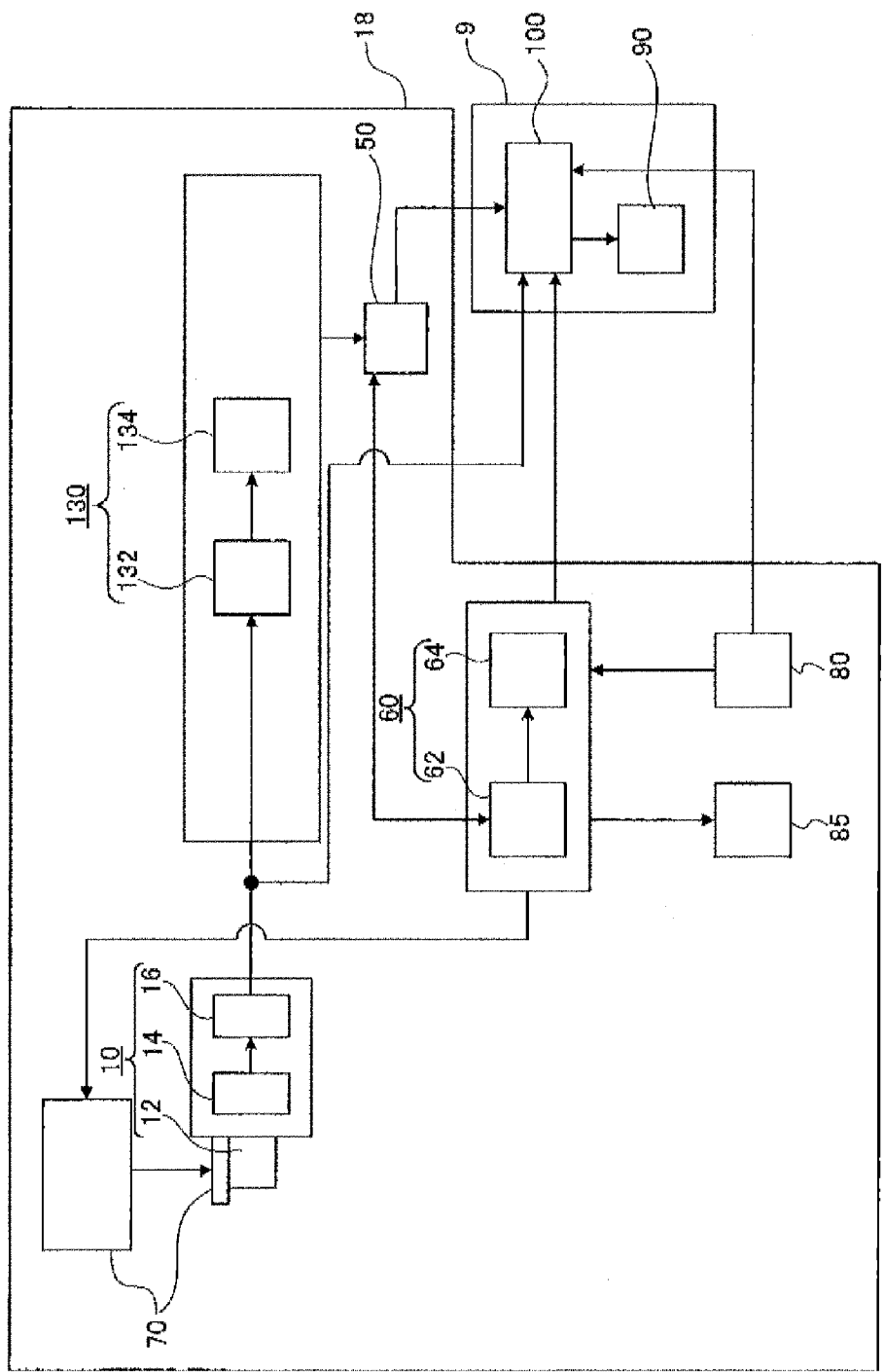
FIG. 21 is a block diagram showing a modified example of Embodiment 1 of the present invention.

FIG. 21 shows a modified example of Embodiment 1, specifically shows a configuration of the lens cleaning apparatus 18 controlling the cleaning mode of the lens 12 based on the degree of the white turbidity U calculated using the distribution of the edge strengths. The configuration is substantially identical to that shown in FIG. 2, but includes a turbidity degree calculating unit 130 instead of the turbidity degree calculating unit 40.

In FIG. 21, the turbidity degree calculating unit 130 includes an edge strength calculating unit 132 which calculates the edge strengths of the image taken by the imaging unit 10, and an edge strength analyzing unit 134 which calculates the distribution of the edge strengths of the image based on the edge strengths calculated by the edge strength calculating unit 132 and calculates the degree of the white turbidity U on the lens 12 based on the distribution of the edge strengths of the image.

Next, process for calculating the degree of the white turbidity U on the lens 12 based on the distribution of the edge strengths of the image is explained with reference to FIG. 22.

Figure 22:
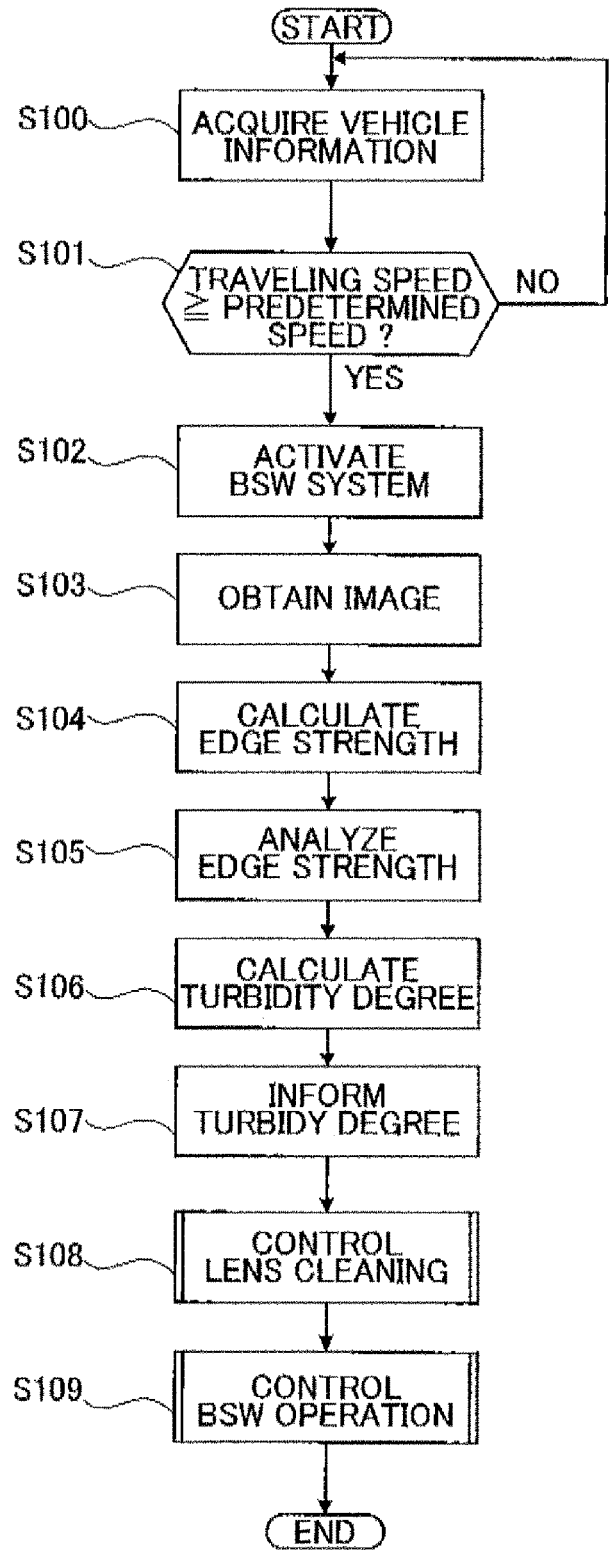
FIG. 22 is a flowchart of a main routine executed by the lens cleaning apparatus according to the modified example of Embodiment 1 of the present invention.

A process shown in FIG. 22 flowchart is the same as that of FIG. 4 flowchart except for the steps to calculate the degree of the white turbidity U (Steps S104, S105, and S106). The following explanation is, therefore, focused on the differences.

In Step S104, the edge strength calculating unit 132 defines a processing area to detect edges in the image I (x, y) taken by the imaging unit 10. The processing area to detect edges can be the whole area of the image I (x, y) or can be limited to a specific area where the edges may appear.

To be specific, during daytime, the edge strength calculating unit 132 may define the processing area to include a horizontal line in the rear of the subject vehicle 5, detect the edge strengths in the defined processing area, and calculate the edge strengths thereof based on the edges corresponding to the horizontal line. In contrary, during night-time, the edge strength calculating unit 132 may define the processing area to include the adjacent lanes $L_1$, $L_3$, detect the edge strengths in the defined processing area, and calculate the edge strengths thereof based on the edges of the vehicle traveling on the adjacent lane. Note that the edge strength calculating unit 132 distinguishes the daytime and the nighttime based on, for example, a gain value adjusted by the gain adjusting unit 16.

Next, the edge strength calculating unit 132 applies an edge detection operator to the processing area defined in Step S104 to calculate the edge strength of each pixel in the image I (x, y). Note that coefficients of an edge detection filter used for the edge detection operator are not limited to specific values.

Next, in Step S105, the edge strength analyzing unit 134 calculates an average edge strength by averaging the edge strengths calculated for each pixel of the image I (x, y). The average edge strength is normalized with the size of the processing area. Smaller the calculated average edge strength, smaller the clearness of the image I (x, y) is obtained, i.e., the degree of the white turbidity is higher. On the other hand, greater the average edge strength, higher the clearness of the image I (x, y) is obtained, i.e., the degree of the white turbidity is lower.

Further, in Step S106, the degree of the white turbidity U is calculated based on the calculated average edge strength.

The average edge strength is calculated from a single image in the above example. However, the average edge strength may be calculated by averaging the average edge strengths of plural images taken at different times. With this, it becomes possible to estimate the clearness of the image accurately even if a sudden noise has appeared in the image. Further, the edge strength analyzing unit 134 calculates a change rate of the average edge strengths for a specific time period to decide if accuracy of the calculated average edge strength (i.e., accuracy of the degree of the white turbidity) is high. When the change rate of the average edge strengths is small, the unit 134 decides that the accuracy of the degree of the white turbidity is high and calculates the certainty factor F to use for the lens cleaning control.

As explained above, in the lens cleaning apparatus according to Embodiment 1 of the invention, the imaging unit 10, which is installed to the subject vehicle 5, monitors or observes circumference thereof and converts an optical signal passed through the lens 12 into the image I (x, y), the turbidity degree calculating unit 40 calculates the degree of the white turbidity U on the surface of the lens 12 based on a brightness characteristic (such as a brightness gradient g and an edge strength distribution) of the image I (x, y), and the lens cleaning control unit 60 sets a cleaning mode for spraying the cleaning fluid 114 or the compressed air 120 based on the calculated degree of the white turbidity U to clean the lens surface and a first predetermined turbidity degree $a_1$ and a second predetermined turbidity degree $a_2$ which is greater than the first predetermined degree $a_1$. With this, it becomes possible to clean the lens surface with the cleaning mode set in response to the degree of the white turbidity U on the lens 12, thereby enabling to remove the white turbidity on the lens 12 efficiently.

Specifically, the lens control unit 60 monitors the gain value adjusted by the gain adjusting unit 16 and calculates the degree of the white turbidity U based on the brightness gradient g of the headlight of the following vehicle when the monitored gain value is equal to or greater than the predetermined gain value (i.e., when it is night-time). Since the headlight of the following vehicle is clearly imaged during night-time, it becomes possible to obtain a highly reliable degree of the white turbidity U.

Further, the lens cleaning apparatus 8 according to the modified example of Embodiment 1 of the invention calculates the degree of the white turbidity U based on an edge strength of the image I (x, y) when a light source such as the headlight does not clearly appear in the image I (x, y). With this, it becomes possible to obtain a highly reliable degree of the white turbidity U.

Further, in the lens cleaning apparatus 8 according to Embodiment 1 of the invention, the cleaning unit 70 performs a mode to drip a drop of the cleaning fluid 114 on the lens surface to form a film 112 of the cleaning fluid 114 on the lens surface when the white turbidity U is between the first predetermined turbidity degree $a_1$ and the second predetermined turbidity degree $a_2$, which is set greater than the first predetermined turbidity degree $a_1$. Consequently, the visual field of the imaging unit 10 becomes clear, and the imaging unit 10 can take a sufficiently clear image I (x, y) for detecting the approaching vehicle.

Further, in the lens cleaning apparatus 8 according to Embodiment 1 of the invention, the cleaning unit 70 performs a mode to spray the cleaning fluid 114 together with the compressed air 120 onto the lens surface when the white turbidity U is greater than the second predetermined turbidity degree $a_2$. With this, the white turbidity on the lens surface should be removed (cleaned out) from the lens surface. Consequently, the visual field of the imaging unit 10 becomes clear, and the imaging unit 10 can take a sufficiently clear image I (x, y) for detecting the approaching vehicle.

Further, in the lens cleaning apparatus 8 according to Embodiment 1 of the invention, the cleaning unit 70 performs a mode to spray only the compressed air 120 onto the lens surface when the white turbidity degree U is equal to or smaller than the first predetermined turbidity degree $a_1$. With this, a drop of the cleaning fluid 114 attached on other than the lens surface is blown out. Consequently, the visual field of the imaging unit 10 becomes clear, and the imaging unit 10 can take a sufficiently clear image I (x, y) for detecting the approaching vehicle.

Further, in the lens cleaning apparatus 8 according to Embodiment 1 of the present invention, the lens cleaning control unit 60 includes a function to warn the driver when the degree of the white turbidity U is continuously equal to or greater than the predetermined turbidity degree of until the counter value for the duration time Cf becomes equal to or greater than the predetermined counter value tf. Hence, the lens cleaning control unit 60 can terminate the operation of the system using the image I (x, y) taken by the imaging unit 10 (e.g., the BSW system 9) by warning the driver when the degree of the white turbidity U is relatively high. With this, it becomes possible to prevent from a detection error of a misdetection of the approaching vehicle, which may be caused by processing the image I (x, y) taken by the lens 12 with the white turbidity. And it is also possible to indicate to or inform the occupants of the subject vehicle 5 that the lens 12 is not clean and cleaning the lens 12 is required.

Further, in the lens cleaning apparatus 8 according to Embodiment 1 of the present invention, the turbidity degree calculating unit 40 calculates the certainty factor F of the degree of the white turbidity U and the counter values for the duration time C1, C2, C3 (duration time) based on a time period for which a similar brightness characteristic is continuously calculated (e.g., the total number of times T (period of time) which represents the consecutive number of calculating the brightness gradient g in the same area $R_0$). And the lens cleaning control unit 60 selects the cleaning mode performed by the lens cleaning unit 70 based on at least the degree of the white turbidity U, the certainty factor F of the degree of the white turbidity U, and the counter values for the duration time C1, C2, C3 calculated by the turbidity degree calculating unit 40. Therefore, it becomes possible to select an appropriate cleaning mode to clean or remove the white turbidity on the lens surface in response to the degree of the white turbidity U.

Further, the lens cleaning apparatus 8 according to Embodiment 1 of the present invention includes the vehicle information acquisition unit 80 to detect or determine whether the subject vehicle 5 is traveling on a wet road, and the lens cleaning control unit 60 selects the cleaning mode performed by the lens cleaning unit 70 such that the lens cleaning unit 70 sprays the cleaning fluid 114 onto the lens surface together with the compressed air 120 when the vehicle information acquisition unit 80 determines that the subject vehicle 5 is not traveling on a wet road. With this, it becomes possible to prevent the vehicle 5 from getting wet by dripping a drop of the cleaning fluid 114 when the vehicle 5 is traveling on the dry road.

Note that in Embodiment 1, although the lens cleaning unit 70 automatically cleans the lens 12 by the cleaning mode selected by the lens cleaning control unit 60, an occupant of the subject vehicle 5 may select any one of the cleaning modes arbitrarily to clean the lens 12 at any time.

Therefore, if the imaging unit 10 is also used as a rear view camera (backup camera) to monitor and display the rear of the subject vehicle 5 while in reverse, the occupant of the vehicle 5 can decide to clean the lens 12 to obtain a clear image when an image taken and displayed (shown) by the imaging unit 10 is not clear due to the white turbidity.

Note that this can be achieved by adding a unit to select the cleaning mode and a unit to command the cleaning unit to clean the lens 12 as switching mechanism to the configuration shown in FIG. 2.

Although a CMOS type element is exemplified as a photoelectric conversion unit 14 of the imaging unit 10 in Embodiment 1, the photoelectric conversion unit 14 should not be limited thereto and can be a CCD type element. However, if a high brightness light source such as the headlight is taken by using a CCD type element, electrons collected in the photoelectric conversion unit 14 may overflow to create vertical smears (i.e., a bright lines may appear around the headlight image). Hence, a filtering process to remove vertically long and narrow rectangular ranges (i.e., removing the vertical smears from the image) is required before executing the abovementioned processing.

Further, in Embodiment 1, an image processing system, which cooperates with the lens cleaning apparatus 8 and is mounted on the vehicle, should not be limited to the BSW system 9. For instance, a lane departure warning (LDW) system which detects a lane departure and warn the driver can be used therewith.

Embodiment 2

Next, a lens cleaning apparatus according to Embodiment 2 is explained.

As identical to Embodiment 1, the lens cleaning apparatus according to Embodiment 2 is applied to a vehicle having a BSW system. A difference between Embodiments 1 and 2 is that threshold values for selecting the cleaning mode with respect to the degree of the white turbidity U are changeable in response to use of a water-repellent lens, a degree of the water repellency, use of a hydrophilic lens, and a degree of the hydrophilicity.

The lens cleaning apparatus according to Embodiment 2 of the present invention is now explained.

The configuration of the lens cleaning apparatus 8 according to Embodiment 2 is substantially the same as the configuration according to Embodiment 1. Hence, functional differences from Embodiment 1 are explained with reference to FIGS. 23A and 23B.

Figure 23A:
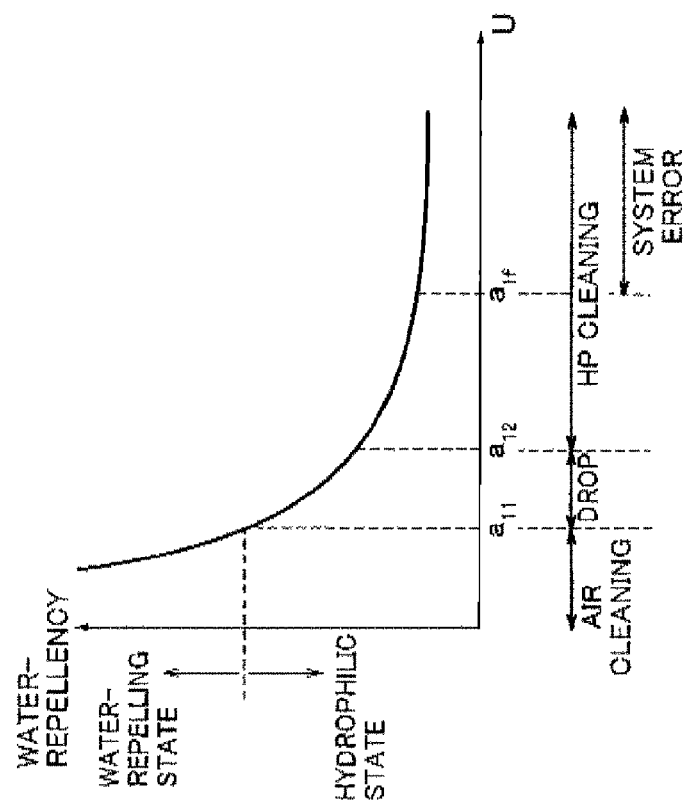
FIG. 23A shows an example of operation performed on a water-repellent lens.
Figure 23B:
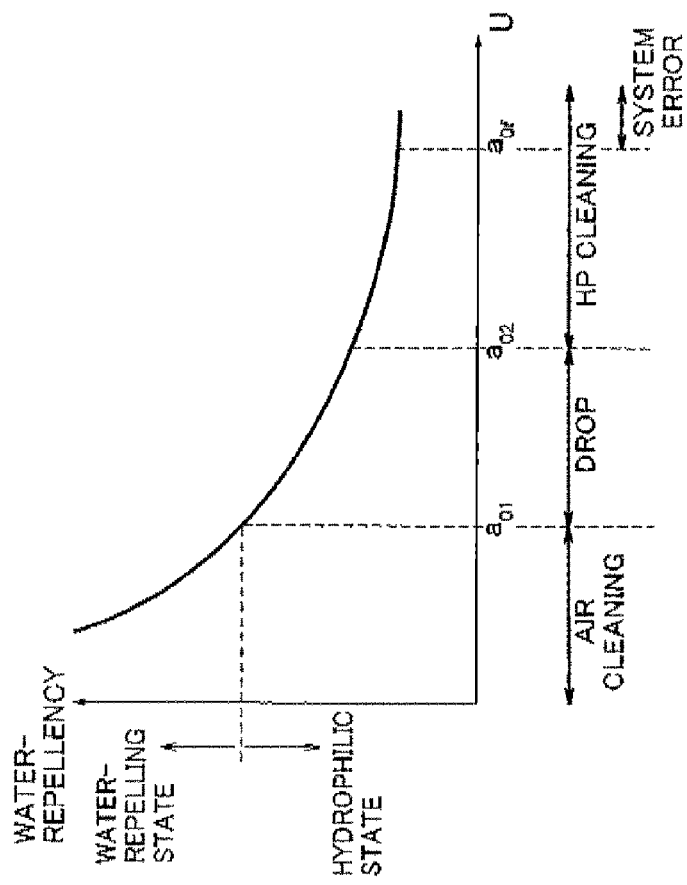
FIG. 23B shows an example of operation performed on a non-water-repellent lens.

FIG. 23A shows a change of water repellency of the water repellent lens 12 in response to a change of a degree of the white turbidity U, and FIG. 23B shows a change of the water repellency of the non-water repellent lens 12 in response to a change of a degree of the white turbidity U.

As shown in FIGS. 23A and 23B, the water-repellent lens 12 secures the water repellency until the degree of the white turbidity U becomes relatively high (i.e., until the threshold value $a_{01}$). After then, the state of the lens surface is slowly changed to a hydrophilic state as increasing the degree of the white turbidity U.

On the other hand, the non-water-repellent lens 12 loses the water repellency when the degree of the white turbidity U gets relatively low (i.e., the threshold value $a_{11}$). After then, the state of the lens surface is dramatically changed to a hydrophilic state as increasing the degree of the white turbidity U.

When the lens 12 has the water repellency, the lens cleaning apparatus 8 can blow out drops of water attached on the lens surface by the abovementioned air cleaning, thereby obtaining a clear visual field.

In this embodiment, threshold values of the degree of the white turbidity for selecting a cleaning mode is changed in accordance with use of water-repellent treatment, degree of the water repellency, on the lens 12.

Specifically, the threshold values $a_{01}$, $a_{11}$ of the degree of the white turbidity U to switchover between the air cleaning mode and drop cleaning mode, the threshold values $a_{02}$, $a_{12}$ of the degree of the white turbidity U to switchover between the drop cleaning mode and high pressure cleaning mode, and the threshold values $a_{0f}$, $a_{1f}$ of the degree of the white turbidity U to determine the system error are set in accordance with the use of the water-repellent treatment and/or the degree of the water repellency of the lens in use.

Those thresholds of the degree of the white turbidity U are pre-stored in the lens cleaning control unit 60. Hence, the cleaning control unit 60 can select or switchover the cleaning mode at a prearrange timing dependent on the lens 12 in use.

Further, the cleaning control unit 60 may pre-store variety of thresholds of the degree of the white turbidity U and choose the threshold values dependent on the lens 12 in use.

Although the above explanation is made with reference to a water-repellent lens, this explanation should be applied to a hydrophilic lens as well. Therefore, the lens cleaning control unit 60 can clean the hydrophilic lens 12 with the cleaning mode selected in accordance with the degree of the white turbidity U.

Note that once a drop of water attaches onto a hydrophilic lens 12, the drop covers the lens surface as a film, i.e., the drop of water does not remain on the lens surface as a drop. Therefore, the air cleaning mode may be excluded from the cleaning modes for the hydrophilic lens 12.

As explained above, in the lens cleaning apparatus 8 according to Embodiment 2 of the present invention, the lens cleaning control unit 60 changes threshold values of the degree of the white turbidity U for selecting the cleaning mode for spraying the cleaning fluid 114 or the compressed air 120 in accordance with use of water-repellent treatment, degree of the water repellency, use of hydrophilic treatment, and degree of the hydrophilicity of the lens 12.

In Embodiments 1 and 2, the brightness gradient g on a line (predetermined line) extending to one direction is calculated for calculating the degree of the white turbidity U. However, it should not be limited thereto. And the lines may be set as shown in FIGS. 24A to 24E.

Figure 24A:
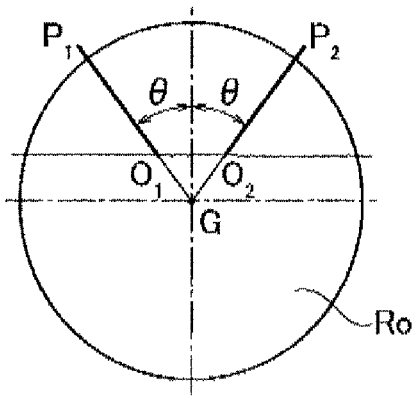
FIG. 24A is an example in which two predetermined lines extending obliquely upward to be horizontally symmetric are set.
Figure 24B:
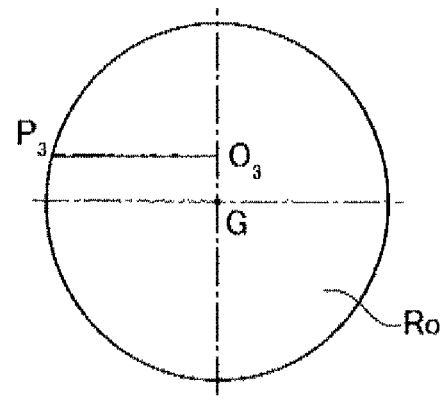
FIG. 24B is an example in which a single predetermined line extending horizontally to left is set.
Figure 24C:
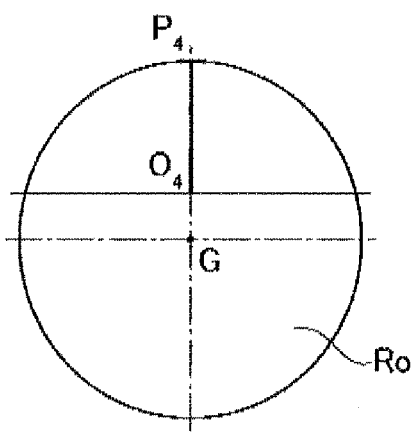
FIG. 24C is an example in which a single predetermined line extending vertically upward is set.

To be specific, as shown in FIG. 24B, the predetermined line may be the line $O_3P_3$ horizontally extending from the searching start point $O_3$, which is set above the center of gravity G of the area $R_0$ on the vertical line passing through the center of gravity G, towards the left. Or, as shown in FIG. 24C, the predetermined line may be the line $O_4P_4$ vertically extending from the searching start point $O_4$, which is set above the center of gravity G of the area $R_0$ on the vertical line passing through the center of gravity G, to upward.

Further, as explained in Embodiment 1, a plurality of lines may be set. In this case, the predetermined lines may extend to right-and-left directions as explained in Embodiment 1. Or, as shown in FIG. 24A, the predetermined lines may be the lines $O_1P_1$, $O_2P_2$ extending from the center of gravity G of the area $R_0$ towards right or left direction respectively with an angle to the vertical line. Note that the searching start points $O_1$, $O_2$ are also set above the center of gravity G of the area $R_0$.

When there are plural predetermined lines, the brightness gradients g calculated along the lines are averaged to calculate the degree of the white turbidity U, as explained in Embodiment 1. Further, when there are plural predetermined lines, a gap $G_I$ between each brightness gradient may be calculated to determine the reliability of the area $R_0$.

Figure 24D:
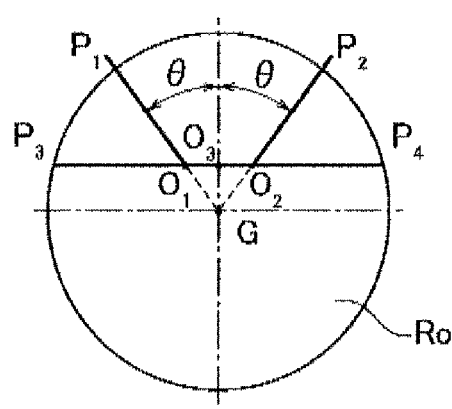
FIG. 24D is an example in which two predetermined lines extending obliquely upward to be horizontally symmetric and other two predetermined lines extending horizontally to right and left are set.

Further, as shown in FIG. 24D the predetermined lines may extend toward other directions. In FIG. 24D, in addition to the lines $O_1P_1$, $O_2P_2$, as explained with reference to FIG. 24A, a line $O_3P_3$ extending to the left, and a line $O_3P_4$ extending to the right are set as the predetermined lines.

The brightness gradients g calculated along with the plural lines are averaged to calculate the degree of the white turbidity U. Further, a gap $G_I$ between each brightness gradient g may be calculated to determine the reliability of the area $R_0$.

Although the lines in FIGS. 24A and 24B are set to be left-right symmetric to the vertical line passing through the center of gravity G of the area $R_0$, it should not be limited thereto, i.e., the lines which are not left-right symmetric to the vertical line passing through the center of gravity G of the area $R_0$ may be set.

Especially, when the white turbidity on the lens surface has a substantially circular shape, i.e., when the white turbidity is symmetric to the center of the gravity G of the area $R_0$, brightness gradients g along with lines extending from the center of gravity G of the area $R_0$ to peripheral edge of the area $R_0$ have substantially the same shapes regardless of the directions of the lines. Therefore, a plurality of lines may be set regardless of left-right symmetry of the lines.

The brightness gradients g calculated along with the lines set as explained above are averaged to calculate the degree of the white turbidity U, and the gap $G_I$ between each brightness gradient g is calculated to determine the reliability of the area $R_0$.

When plurality of lines are set and plurality of brightness gradients g are calculated along with the lines, a brightness gradient g with abnormal value may be excluded before averaging the brightness gradients g. Hence, when a sudden noise appears on a line, it becomes possible to exclude the line with the noise to search the brightness distribution Ld. Consequently, it is possible to reduce influence of the noise and to calculate a highly reliable brightness gradient g and degree of the white turbidity U.

Figure 24E:
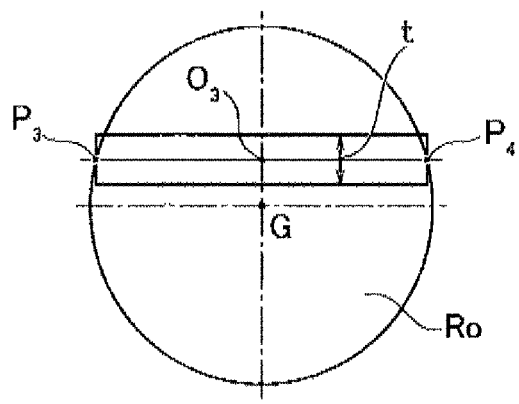
FIG. 24E is an example in which two predetermined rectangular areas extending horizontally are set.

Further, searching the brightness distribution Ld may be performed on a long and narrow space as shown in FIG. 24E, instead of a line.

In FIG. 24E, after setting the searching start point $O_3$ on the vertical line passing through the center of gravity G of the area $R_0$, the line $O_3P_3$ extending from the searching start point $O_3$ toward the left, and the line $O_3P_4$ extending towards the right; a space having thickness (width) t in an orthogonal direction to the direction of the lines $O_3P_3$, $O_3P_4$ is set.

Further, the brightness gradient calculating unit 30 calculates a total sum of brightness values in the direction orthogonal to the line $O_3P_3$ (i.e., the direction of the thickness t) along with the line $O_3P_3$ in the space, and calculates the distribution of the total sum.

Further, the brightness gradient calculating unit 30 calculates the brightness gradient g from the distribution of the total sum as explained above. Note that the first and second threshold values A, B used for calculating the brightness gradient g are modified in response to the thickness t of the space.

The unit 30 also calculates a distribution of a total sum regarding the line $O_3P_4$ and calculates a brightness gradient g.

Then, the degree of the white turbidity U is calculated as explained above and determines the reliability of the degree U.

As explained above, since a space extending along with the lines is set (defined) such that influence of a sudden noise is suppressed compared to searching a brightness value on the line, it becomes possible to calculate a stable brightness gradient g, and thus possible to determine the reliability or certainty of the degree of the white turbidity U accurately.

Although the present invention has been described in terms of exemplary embodiments, it is not limited thereto. It should be appreciated that variations may be made in the embodiments described by persons skilled in the art without departing from the scope of the present invention as defined by the following claims.

CROSS-REFERENCE TO RELATED APPLICATION

The present application is based on and claims priority from Japanese Patent Application No. 2012-167302, filed on Jul. 27, 2012 with Japanese Patent Office, and the disclosure of which is hereby incorporated by reference in its entirety.

REFERENCE NUMERICAL LIST

8 lens cleaning apparatus
9 Blind Spot Warning (BSW) system
10 imaging unit
12 lens
14 photoelectric conversion unit
16 gain adjusting unit
20 area identifying unit
30 brightness gradient calculating unit
40 turbidity degree calculating unit
42 brightness gradient average value calculating unit
44 similarity calculating unit
46 certainty factor calculating unit
50 turbidity degree informing unit
60 lens cleaning control unit
62 auto-cleaning deciding unit
64 system error determining unit
70 lens cleaning unit
80 vehicle information acquisition unit
85 information output unit
90 warning output unit
100 approaching vehicle detecting unit

The invention claimed is:

1. A lens cleaning apparatus, comprising:
an imaging unit mounted on a subject vehicle to observe circumference of the subject vehicle through a lens and convert an optical signal of the observed circumference into an image signal;
a turbidity degree calculating unit configured to calculate a degree of white turbidity on the lens from the image signal based on brightness characteristics of the image signal;
a lens cleaning unit to clean a surface of the lens using at least one of cleaning fluid and compressed air; and
a lens cleaning control unit configured to set a cleaning mode for spraying at least one of the cleaning fluid and the compressed air, which is performed by the lens cleaning unit, based on the calculated degree of the white turbidity on the lens and a first predetermined turbidity degree and a second predetermined turbidity degree which is greater than the first predetermined degree,
wherein the turbidity degree calculating unit determines, as a certainty factor of the degree of the white turbidity, a total number of times of identifying areas in the respective image signals obtained in routines as representing a same light source based on changes in the degree of the white turbidity.

2. The apparatus according to claim 1, wherein the brightness characteristic is a brightness gradient.

3. The apparatus according to claim 1, wherein the brightness characteristic is an edge strength.

4. The apparatus according to claim 1, wherein the lens cleaning control unit sets a drop cleaning mode as said cleaning mode in which the lens cleaning unit drips a drop of the cleaning fluid on the lens surface to form a film of the cleaning fluid on the lens surface when the calculated degree of the white turbidity is between the first and second predetermined turbidity degrees.

5. The apparatus according to claim 1, wherein the lens cleaning control unit sets a high-pressure cleaning mode as said cleaning mode in which the lens cleaning unit sprays the cleaning fluid together with the compressed air onto the lens surface when the calculated degree of the white turbidity is greater than the second predetermined turbidity degree.

6. The apparatus according to claim 1, wherein the lens cleaning control unit sets an air cleaning mode as said cleaning mode in which the lens cleaning unit sprays only the compressed air onto the lens surface when the calculated degree of the white turbidity is equal to or smaller than the first predetermined turbidity degree.

7. The apparatus according to claim 1, wherein the lens cleaning control unit informs a driver that the degree of the white turbidity is equal to or greater than a third predetermined turbidity degree for a corresponding predetermined time, and said third predetermined turbidity degree is greater than the first and second predetermined turbidity degrees.

8. The apparatus according to claim 1, wherein the turbidity degree calculating unit calculates the certainty factor of the calculated degree of the white turbidity and a duration time of the calculated degree of the white turbidity based on a time period for which a similar brightness characteristic is continuously calculated, and wherein
the lens cleaning control unit sets the cleaning mode at least based on the calculated degree of the white turbidity, the calculated certainty factor, and the calculated duration time.

9. The apparatus according to claim 1, wherein the lens cleaning control unit sets the cleaning mode based on use of a water-repellent lens, a degree of water repellency of the water-repellent lens, use of a hydrophilic lens, and a degree of hydrophilicity of the hydrophilic lens.

10. The apparatus according to claim 1, further includes a vehicle information acquisition unit to detect that the subject vehicle is traveling on a wet road, wherein the lens cleaning control unit sets a high-pressure cleaning mode as said cleaning mode in which the lens cleaning unit sprays the cleaning fluid together with the compressed air onto the lens surface when the vehicle information acquisition unit detects that the subject vehicle is not traveling on the wet road.

\* \* \* \* \*